United States Patent
Kometani et al.

(10) Patent No.: US 6,168,412 B1
(45) Date of Patent: Jan. 2, 2001

(54) CASTING APPARATUS FOR FORMATION OF RESIN-MADE MEMBRANE

(75) Inventors: Hideo Kometani; Toshio Miki; Masahiro Bessho; Yoshitomo Sakakibara; Daisuke Ooi; Noritaka Hasegawa, all of Aichi-ken (JP)

(73) Assignee: Mitsubishi Heavy Industries, Ltd., Tokyo (JP)

( * ) Notice: Under 35 U.S.C. 154(b), the term of this patent shall be extended for 0 days.

(21) Appl. No.: 09/213,406

(22) Filed: Dec. 17, 1998

(30) Foreign Application Priority Data

Dec. 26, 1997 (JP) .................................................. 9-361275

(51) Int. Cl.[7] .................................................. B29C 41/26
(52) U.S. Cl. .......................... 425/210; 425/224; 425/404; 264/556
(58) Field of Search .................................. 425/210, 224, 425/404; 264/102, 556

(56) References Cited

U.S. PATENT DOCUMENTS

| 2,714,745 | 8/1955 | Kenyon | 425/75 |
| 3,347,962 | 10/1967 | Dieck et al. | 264/556 |
| 3,520,964 | 7/1970 | Metz, Jr. | 264/556 |
| 3,930,923 | 1/1976 | Elliot | 156/244 |
| 4,310,295 | 1/1982 | Heyer | 425/224 |

FOREIGN PATENT DOCUMENTS 0 057 106  8/1982 (EP) .

OTHER PUBLICATIONS

Patent Abstracts of Japan, vol. 014, No. 083, Feb. 16, 1990 & JP 01–299018 A (Teijin Ltd), Dec. 1, 1989 (abstract).
Patent Abstracts of Japan, vol. 014, No. 221 (M–0971), May 10, 1990, & JP 02–052721 A, Feb. 22, 1990 (abstract).

Primary Examiner—James P. Mackey
Assistant Examiner—Donald Heckenberg
(74) Attorney, Agent, or Firm—Armstrong, Westerman, Hattori, McLeland & Naughton

(57) ABSTRACT

The present invention relates to a casting apparatus for formation of a resin-made membrane, which comprises a temperature adjusting unit (a temperature sensor, a heating wire type heater and a temperature controller) whereby an inner wall surface temperature of a suction chamber can be set to a desired temperature. Thus, if a design is made to prevent the temperature of the inner wall surface of the suction chamber from dropping, no contamination of the inner wall of the suction chamber by a volatile matter occurs, so that it is possible to prevent the volatile matter from dropping onto a cooling roll to make a membrane dirty.

17 Claims, 12 Drawing Sheets

CASTING APPARATUS FOR FORMATION OF RESIN-MADE MEMBRANE

BACKGROUND OF THE INVENTION

1) Field of the Invention

The present invention is for the purpose of forming a film-like or sheet-like resin-made membrane (a thin-film), and relates to a resin-made membrane formation casting apparatus suitably used, for example, as a biaxial oriented film machine, a non-oriented film machine, a sheet machine, and others.

2) Description of the Related Art

FIGS. 11 and 12 are respectively a side elevational view and a front elevational view each illustratively showing a prior resin-made membrane formation casting apparatus. Although FIG. 12 shows only one end portion side of the prior apparatus in its width direction, the other end portion side is constructed in a similar way.

As shown in FIGS. 11 and 12, the prior apparatus is equipped with a T die 101 for extruding a molten resin from an extruding machine (not shown) into a film-like or sheet-like membrane 102, a casting roll (cooling roll) 103 for receiving the membrane 102 extruded from the T die 101 on its outer circumferential surface to cool and deliver the membrane 102, and a suction chamber (vacuum box) 104 for stably making the membrane 102 come closely into contact with the surface of the casting roll 103.

In this constitution, the casting roll 103 is supported by a roll supporting shaft 106 to be rotatable with respect to a side frame 107.

The suction chamber 104 is fixedly secured on one side surface of the T die 101. Further, a vacuum pump 105 is in a coupled relation to the suction chamber 104 so that, when this vacuum pump 105 is placed into operation, the air between the membrane 102 and the casting roll 103 is sucked through an opening section 104a of the suction chamber 104.

The opening section 104a is made throughout the overall width of the membrane 102 in the proximity of a portion where the membrane 102 starts to come closely into contact with the outer circumferential surface of the casting roll 103. Further, a seal gap 104b is defined between the suction chamber 104 and the casting roll 103. The dimension of the seal gap 104b is set to ensure a required suction force (pressure reduction level) at the close contact section between the membrane 102 and the casting roll 103 concurrently with allowing the rotation of the casting roll 103. In FIGS. 11 and 12, reference numeral 108 represents wheels to be used when shifting this apparatus.

With the above-mentioned constitution, the resin molten by the non-shown extruding machine passes through the T die 101 to be extruded into a film-like or sheet-like membrane 102 which in turn, is placed on the outer circumferential surface of the casting roll 103 to be cooled for formation.

At this time, the air within the suction chamber 104 is sucked by the vacuum pump 105 so that the air in the close contact section between the membrane 102 and the casting roll 103 is sucked through the opening section 104a of the suction chamber 104. Whereupon, that close contact section is pressure-reduced to discharge the air taken in between the membrane 102 and the casting roll 103, with the result that the membrane 102 made of the molten resin can stably be brought into contact with the casting roll 103.

In this case, depending upon the kind of resin, on the condition that an interval between the T die 101 and the casting roll 103 is small, the orientation of the molten resin due to its extension is not relieved, but the resin is cooled and solidified on the casting roll 103, and hence, a necessary film characteristic (membrane characteristic) is unobtainable. In addition, under the condition that the interval between the T die 101 and the casting roll 103 is small, the microscopic surface irregularities occurring at the exit of the T die 101 is unreducible in the extension interval, and after being cooled and solidified, they remain as the surface roughness, thereby deteriorating the film quality (membrane quality).

Accordingly, a way of adjusting the interval between the T die 101 and the casting roll 103 in accordance with kinds of resins can be taken in order to attain the necessary film characteristic (membrane characteristic).

In the apparatus shown in FIGS. 11 and 12, although the interval between the T die 101 and the casting roll 103 is not necessarily easy to vary because the suction chamber 104 is in a fixed relation to the T die 101, the adjustment of the interval between the T die 101 and the casting roll 103 is accomplished through the adjustment of the fitting condition of the suction chamber 104 to the T die 101 or through the adjustment in relative position between the casting roll 103 and the T die 101 based upon the movement of the casting roll 103 by the wheels 108.

However, in such a prior resin-made membrane formation casting apparatus, since the suction of ambient air takes place when the vacuum pump 105 sucks air from the close contact section between the membrane 102 and the casting roll 103, depending upon the air suction gas quantity, the surface temperature of the inner wall of the suction chamber 104 varies due to the heat transfer between the inner wall surface of the suction chamber 104 and the suction air flows at the atmospheric temperature level.

Particularly, in the case of a large suction gap quantity (high negative pressure), the thermal conductivity rises between the inner wall surface of the suction chamber 104 and the suction air flows at the atmospheric temperature level, so that the surface temperature of the inner wall surface of the suction chamber 104 may decrease to the atmospheric level.

In general, in a resin-made membrane formation casting apparatus for forming a plastic film or a sheet-like resin-made membrane made of a material such as a polyethylene, polypropylene, polyethylene terephthalate and nylon, in the vicinity of an extruding machine for extrusion of a molten resin, particularly, at the periphery of the T die 101, volatile gases such as a residual monomer, oligomer and additive come into existence, and the volatile gases are sucked and removed from the suction chamber 104 together with air caught up into between the casting roll 103 and the membrane 102.

At this time, in a state where the surface temperature of the inner wall surface of the suction chamber 104 does down due to the heat transfer between the suction air flows and the inner wall surface of the suction chamber 104, the volatile gas such as an additive attaches as a volatile matter to the inner wall surface of the suction chamber 104 in a condensed condition. This condensed and attaching volatile matter is accumulated with the passage of time, and drops onto the casting roll 103 to make the casting roll 103 and the membrane 102 dirty, which deteriorates the film quality. In addition, if the attaching and accumulating matter resulting from the drop onto the casting roll 103 gets mixed in the film (membrane 102), this can cause the film to be broken.

SUMMARY OF THE INVENTION

The present invention has been developed with a view to eliminating the above-mentioned problems, and it is therefore an object of this invention to provide a resin-made membrane formation casting apparatus which is capable of preventing the drop of the temperature of an inner wall surface of a suction chamber for the absence of attachment of volatile matters onto the inner wall of the suction chamber leading to the contamination of a membrane by the falling of the volatile matters onto a cooling roll.

For this purpose, in accordance with this invention, a casting apparatus for formation of a resin-made membrane is composed of a die for extruding a molten resin into a membrane, a cooling roll for receiving the membrane extruded from the die on its outer circumferential surface to deliver the membrane while cooling, a suction chamber for sucking air from between the membrane and the cooling roll to make the membrane come closely into contact with the cooling roll, and a temperature adjusting unit for allowing a temperature of an inner wall surface of the suction chamber to be set to a desired value.

In this resin-made membrane formation casting apparatus, the temperature adjusting unit can include heating means for heating a structural member constituting the suction chamber, detection means for detecting the temperature of the inner wall surface of the suction chamber, and control means for controlling the heating means on the basis of the detection result by the detection means.

On the other hand, in this resin-made membrane formation casting apparatus, it is also appropriate that the temperature adjusting unit is made up of heating means for heating a structural member constituting the suction chamber, cooling means for cooling the structural member, detection means for detecting the temperature of the inner wall surface of the suction chamber, and control means for controlling the heating means and the cooling means on the basis of the detection result by the detection means.

Furthermore, in this resin-made membrane formation casting apparatus, it is also acceptable that the heating means is embedded in the interior of the structural member, it is provided inside the structural member to constitute the inner wall surface of the suction chamber, it is placed along an outer wall surface of the structural member, or it is mounted on another structural member placed closely into contact with the aforesaid structural member.

Still further, in any one of the resin-made membrane formation casting apparatus mentioned above, it is also possible that the heating means comprises a heating wire type heater, or it is composed of a fluid passage situated along the structural member organizing the suction chamber and a temperature-controlled heating medium movable within the fluid passage.

Besides, in the resin-made membrane formation casting apparatus mentioned above, the cooling means can also be composed of a fluid passage situated along the structural member organizing the suction chamber and a temperature-controlled cooling medium movable within the fluid passage.

In addition, it is also appropriate that the desired temperature which can be set by the temperature adjusting unit in the resin-made membrane formation casting apparatus is set to be above an attachment suppressing temperature whereby the attachment of a volatile matter to the inner wall surface of the suction chamber is suppressible.

Accordingly, with the resin-made membrane formation casting apparatus according to this invention, through the use of the temperature adjusting unit which can set the inner wall surface temperature of the suction chamber to a desired value, the inner wall surface temperature of the suction chamber is maintainable to a desired value (for example, above a volatile matter attachment suppressing temperature), which prevents the volatile matters such as additives volatilizing from the membrane from being condensed and attaching onto the inner wall surface of the suction chamber, and hence, which prevents the condensed attachment and accumulation on the inner wall surface of the suction chamber from falling onto the cooling roll to accomplish no contamination of the membrane, with the result that the formation of a membrane with a high quality is feasible.

Furthermore, the temperature adjusting unit can comprise a heating means for heating a structural member constituting the suction chamber, a cooling means for cooling the structural member, and a control means for conducting control on the basis of the detection of the inner wall surface temperature of the suction chamber. In this case, since the inner wall surface of the suction chamber can be cooled by the cooling means, it is possible to shorten the time required for the adjustment of the inner wall surface temperature of the suction chamber, with effective construction. In addition, the formation of a high-quality membrane is feasible.

Still further, if the heating means is provided inside the structural member to constitute the inner wall surface of the suction chamber, the direct control of the inner wall surface of the suction chamber becomes possible to allow the control of the inner wall surface temperature thereof with a high accuracy and to permit certain suppression of the condensation and attachment of volatile maters, so that a high-quality membrane is producible.

Moreover, if the heating means is placed along the outer wall surface of the structural member, its structure becomes simple, which permits manufacturing the apparatus at a low cost, so being economical.

Besides, if the heating means is mounted on a different structural member different from the aforesaid structural member and placed closely into contact therewith, it can be set with a single structure, so being economical.

Furthermore, if comprising a heating wire type heater, the heating means can be constructed simply, so that the apparatus is producible at a low cost and is economical.

Still further, if the heating means is made up of a fluid passage disposed along the structural member constituting the suction chamber and a temperature-controlled heating medium movable within the fluid passage, by changing the temperature of the temperature-controlled heating medium, the inner wall surface temperature of the suction chamber is adjustable to a desired value.

DESCRIPTION OF THE PREFERRED EMBODIMENTS

Figure 1:
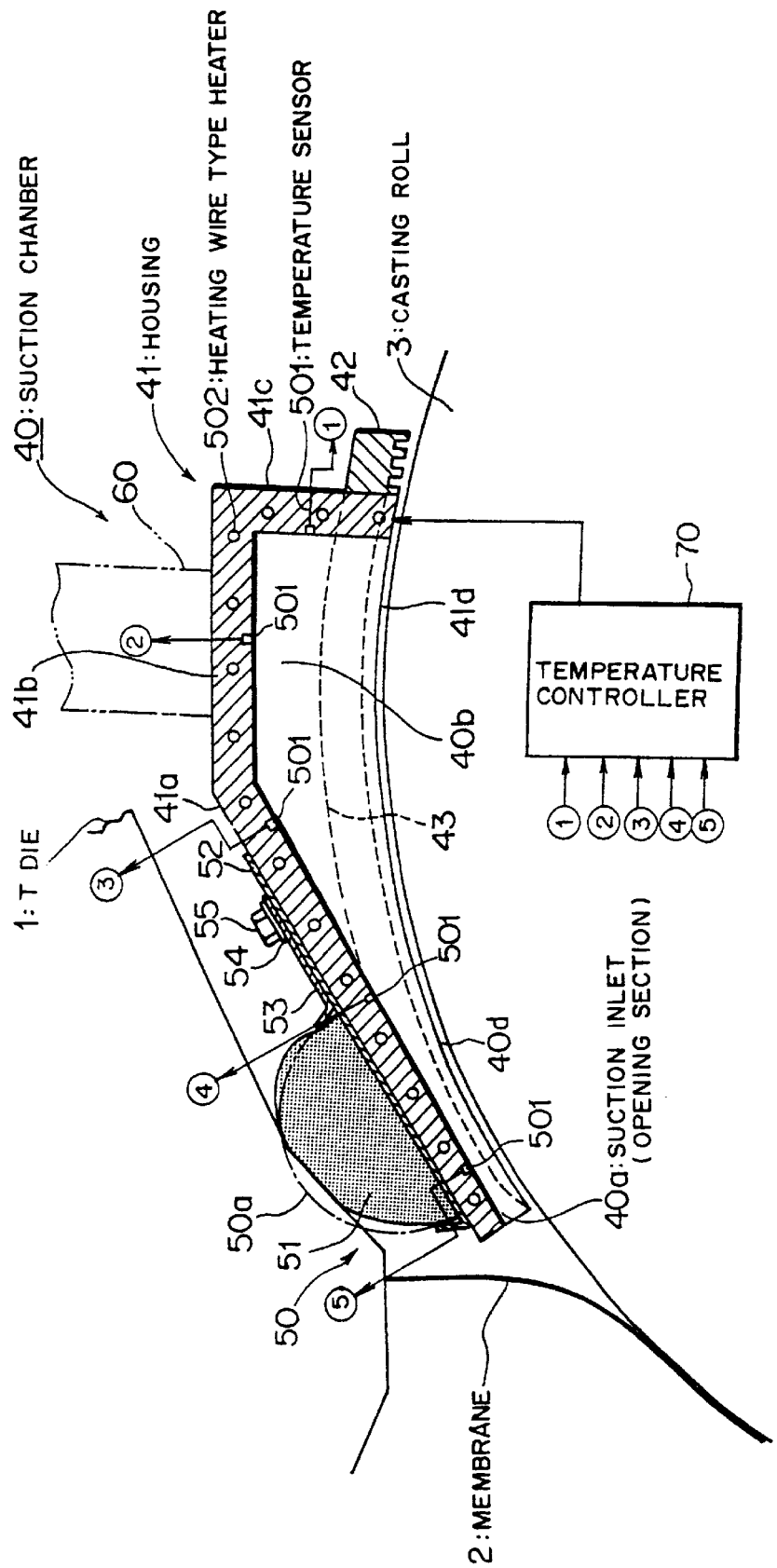
FIG. 1 is a side-elevational and cross-sectional view showing a suction chamber of a casting apparatus for formation of a resin-made membrane according to a first embodiment of the present invention, and further illustrating a control system thereof.
Figure 2:
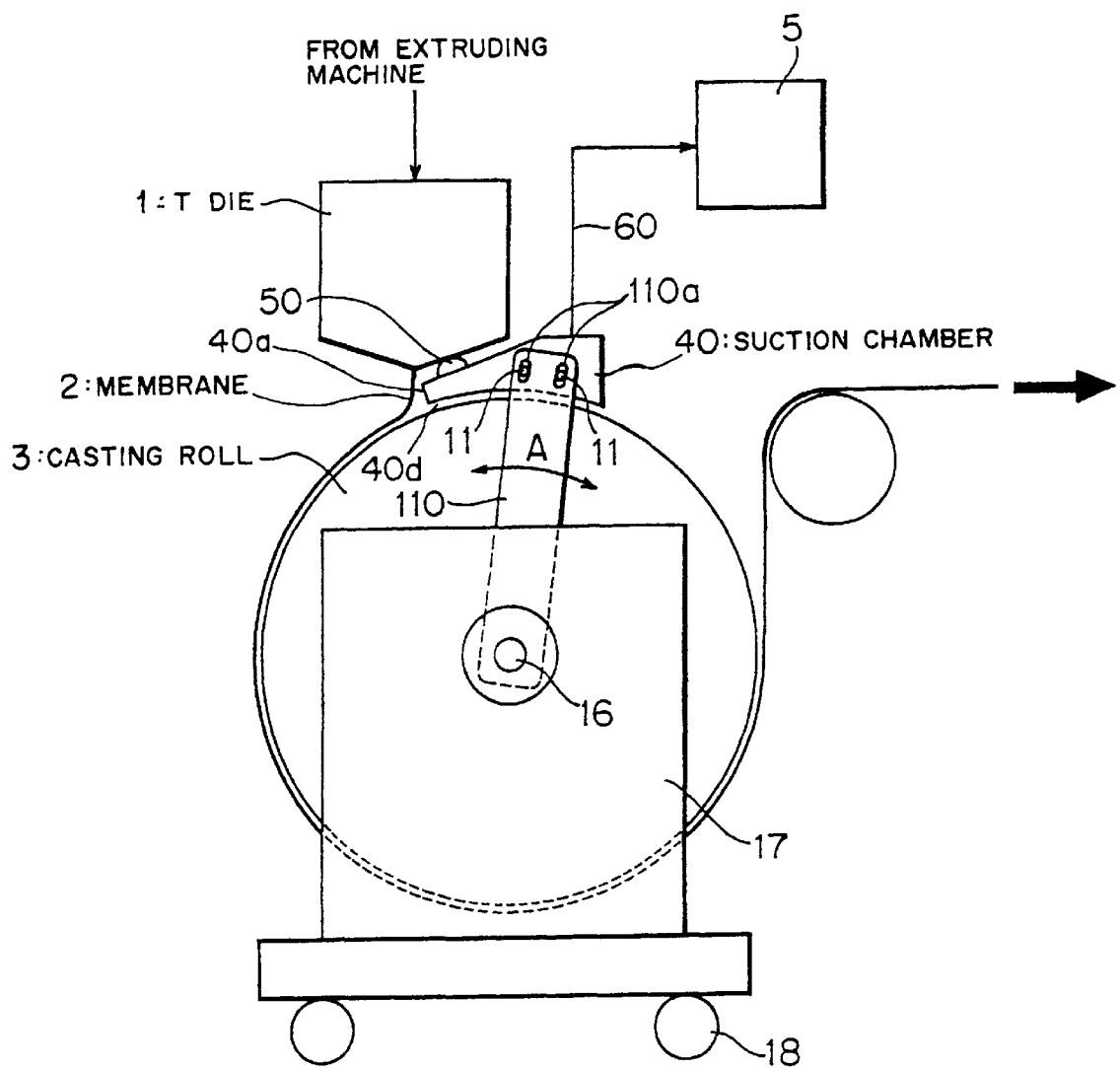
FIG. 2 is a cross-sectional view illustratively showing the resin-made membrane formation casting apparatus according to the first embodiment of this invention.
Figure 3:
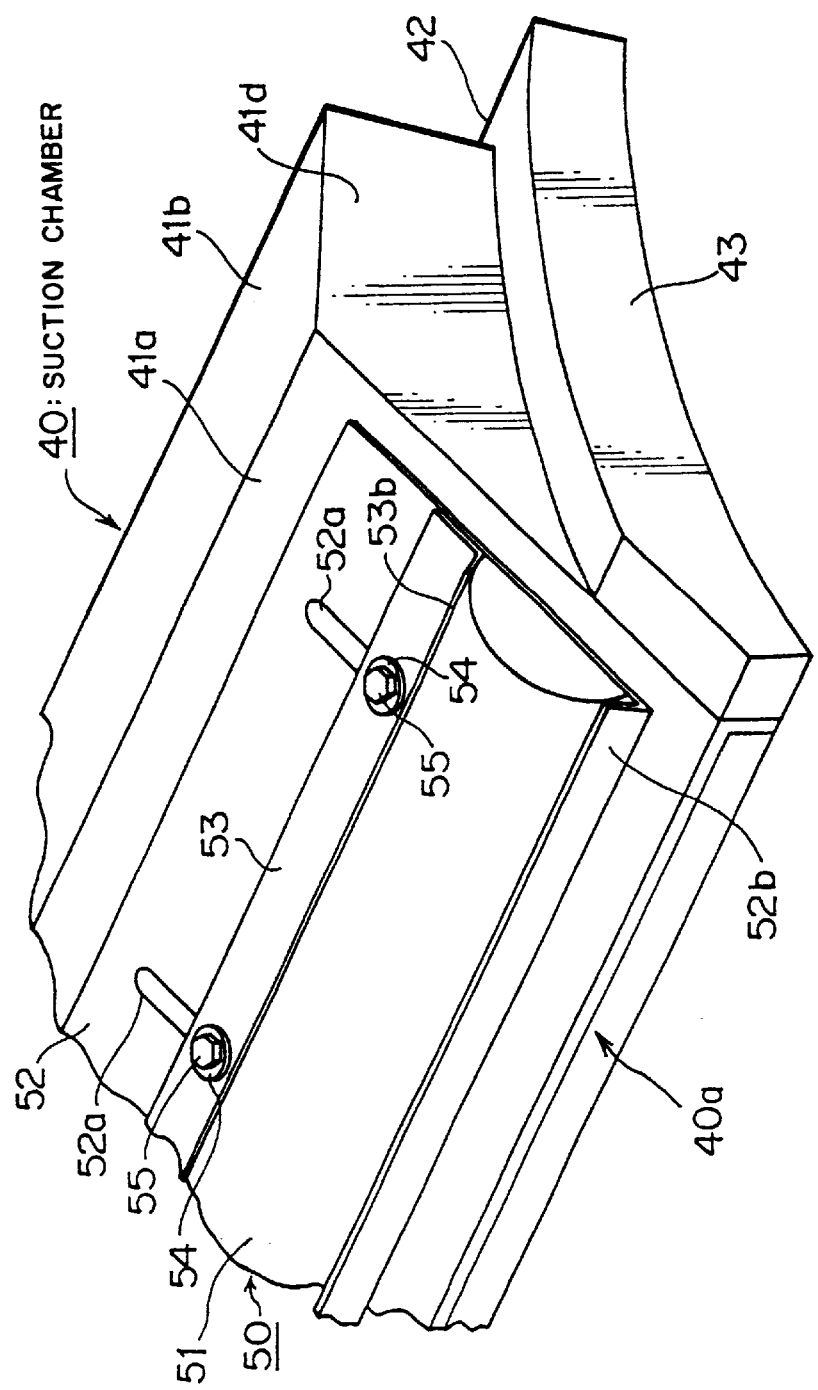
FIG. 3 is a side elevational view illustratively showing the resin-made membrane formation casting apparatus according to the first embodiment of this invention.
Figure 4:
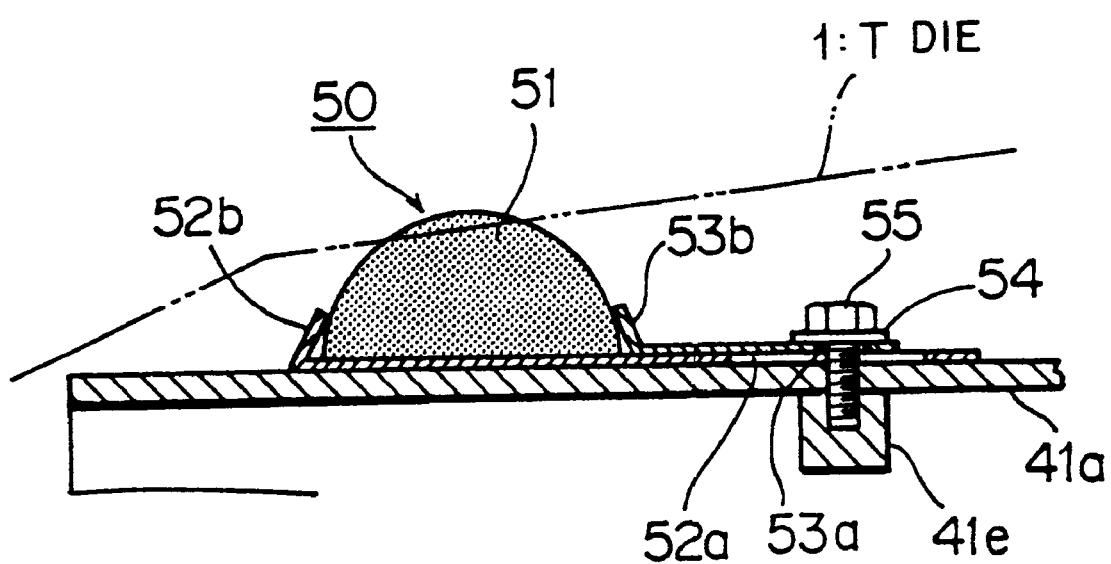
FIG. 4 is side-elevational and cross-sectional view showing a structure of an elastic seal member and a fitting condition thereof in the resin-made membrane formation casting apparatus according to the first embodiment of this invention.

Referring now to the drawings, a description will be made hereinbelow of embodiments of the present invention.
(A) Description of a First Embodiment of the Invention FIGS. 1 to 4 show a casting apparatus for formation of a resin-made membrane according to a first embodiment of the present invention. Of these drawings, FIG. 1 is a side-elevational and cross-sectional view showing its suction chamber, and additionally showing a control system, FIG. 2 is an illustrative side elevational view thereof, FIG. 3 is a partially broken perspective view showing the suction chamber, and FIG. 4 is a side-elevational and cross-sectional view showing a structure and fitting condition of an elastic seal member thereof.

As shown in FIG. 2, the resin-made membrane formation casting apparatus according to the first embodiment of this invention is also composed of a T die (die) 1 for extruding a molten resin from a extruding machine (not shown) into a film-like or sheet-like membrane 2, a casting roll (cooling roll) 3 for receiving the membrane 2 extruded from the T die 1 on its outer circumferential surface to deliver it while cooling, and a suction chamber 40 for sucking air from between the membrane 2 and the casting roll 3 to make the membrane 2 stably brought closely into contact with the surface of the casting roll 3. Further, the casting roll 3 is supported by a roll supporting shaft 16 to be rotatable with respect to side frames 17, and wheels 18 are mounted under the side frames 17, with the wheels 18 being used when this apparatus is shifted in horizontal directions.

In this embodiment, the suction chamber 40 is provided independently of the T die 1. Further, the suction chamber 40 is formed along the outer circumferential surface of the casting roll 3, and a necessary seal gap is defined between the suction chamber 40 and the outer circumferential surface of the casting roll 3. The dimension (interval) of this seal gap is set to ensure a necessary suction force (pressure reduction level) at a close contact section between the membrane 2 and the casting roll 3 while allowing the rotation of the casting roll 3.

Besides, as well as the prior art, a vacuum pump 5 is communicated through a suction duct 60 with the suction chamber 40, and on the operation of this vacuum pump 5, the air between the membrane 2 and the casting roll 3 is sucked through a suction inlet (opening section) 40a of the suction chamber 40 (see FIG. 1). Further, the suction inlet 40a is made throughout the overall width of the membrane 2 in the proximity of the portion where the membrane 2 starts to come closely into contact with the outer circumferential surface of the casting roll 3.

In addition, in this embodiment, a driving member 110 is used as a circumferentially moving mechanism designed to move the suction chamber 40 along a circumferential direction of the casting roll 3 while maintaining the necessary seal gap. This driving member 110 is made such that its proximal side is supported coaxially with a roll supporting shaft (rotary shaft) 16 of the casting roll 3 to be rotatable around the roll supporting shaft 16 (in directions of arrows A in FIG. 2) while its tip side is in a fixed relation to the suction chamber 40.

Furthermore, in the driving member 110, elongated holes 110a are made along the radial directions of the casting roll 3, and in a manner of adjusting the tightening positions of supporting bolts 11 penetrating these elongated holes 110a, the suction chamber 40 is movable in the radial directions of the casting roll 3 with respect to the driving member 110, that is, the suction chamber 40 is fitted so that the necessary seal gap between the outer circumferential surface of the casting roll 3 and the suction chamber 40 is adjustable. The aforesaid elongated holes 110a and supporting bolts 11 constitute a radially moving mechanism.

As shown in FIGS. 1 and 3, the suction chamber 40 is composed of a housing (a structural member constituting the suction chamber 40) 41, comprising upper walls 41a, 41b, a rear wall 41c and left- and right-hand side walls 41d, and labyrinth packings 42, 43 fixedly secured to a rear wall 41c and to outer-surface lower portions of the left- and right-hand side walls 41d, respectively. The labyrinth packing 43 is fixed to the left- and right-hand side walls 41d.

Furthermore, a front side (left side in FIG. 1) of the suction chamber 40 is open, and a suction inlet (opening section) 40a is made between the upper wall 41a of the suction chamber 40 and an outer circumferential surface of the casting roll 3. In addition, the housing 41 is closed by the outer circumferential surface of the casting roll 3 from the below except the suction inlet 40a, and a suction room 40b is defined between the housing 41 and the casting roll 3.

The labyrinth packings 42, 43 stand against the outer circumferential surface of the casting roll 3 in a state where they are in a slightly spaced relation to each other to possibly suppress the inflow of the air from below the rear wall 41c and the left- and right-hand walls 41d. Incidentally, in place of the labyrinth packings 42, 43, it is also possible to use rubber seals, felt seals or the like.

The suction room 40b is coupled through a suction duct 60, fixedly secured to the upper wall 41b, to the vacuum pump 5 (see FIGS. 1 and 2).

In addition, in the resin-made membrane formation casting apparatus according to the first embodiment, heating wire type heaters (sheathed heaters) 502 are embedded at a nearly equal interval in the interior of the housing 41 comprising the upper walls 41a, 41b, the rear wall 41c and the left- and right-hand walls 41d, which constitutes the suction chamber 40, and in the housing 41, temperature sensors 501 acting as detection means for sensing the inner wall surface temperature of the suction chamber 40 are put at a plurality of portions (in this embodiment, 5 portions) corresponding to unit areas (which will be referred hereinafter to as temperature-controlled zones) which are made to undergo temperature adjustment.

Moreover, in this embodiment, a temperature controller 70 is provided to control the heating wire type heaters 502 in accordance with the detection results of the temperature sensors 501. That is, the temperature controller 70 receives information representative of the temperatures measured by the respective temperature sensors 501 as indicated by arrows with circled numerals 1 to 5 in FIG. 1, and compares these temperature information with a given preset value to feedback-control the heating conditions by the heating wire type heaters 502.

More specifically, in the first embodiment, the foregoing temperature sensors 501, heating wire type heaters 502 and temperature controller 70 organize a temperature adjusting unit where each of the temperature sensors 501 detects the inner wall surface temperature of the suction chamber 40 at every temperature-controlled zone on the inner wall of the suction chamber 40 while the temperature controller 70 controls the heating condition by each of the heating wire type heaters 502 for each temperature-controlled zone, thus setting the inner wall surface temperature of the suction chamber 40 to a desired temperature, that is, above a volatile matter attachment suppressing temperature (attachment suppressing temperature).

This volatile matter attachment suppressing temperature is a temperature which can suppress the attachment of a volatile matter(s), contained in the air within the suction chamber 40, to the inner wall surface of the suction chamber 40, and is set on the basis of the composition and concentration of the volatile matter, the coefficient of mass transfer to the inner wall surface, and others.

Furthermore, the entire suction chamber 40 is rotatably supported coaxially (around the roll supporting shaft 16) with the casting roll 3 through the aforesaid circumferentially moving mechanism, so that it is movable along the outer circumferential surface of the casting roll 3 in a state where a necessary gap is maintainable therebetween.

Still further, an elastic seal member 50 is interposed between the T die 1 and the suction chamber 40 to seal the gap therebetween. This elastic seal member 50 is disposed throughout a width exceeding the overall width of the membrane 2, and as shown in FIGS. 1, 3 and 4, is made up of an elastic seal body 51 and fixtures (fitting tools) 52, 53, so that, in response to variation of the gap between the upper surface of the suction chamber 40 and the lower surface of the T die 1, it elastically deforms to automatically and continuously seal the gap therebetween.

The elastic seal body 51 is fixed to the suction chamber 40 in a manner that its lower portion is held between rising portions 52b, 53b of the fixtures 52, 53 in the forward and backward directions and the fixtures 52, 53 are fixedly tightened with fitting bolts 55 with respect to the upper wall 41a of the suction chamber 40.

The fixture 53 is disposed to be placed on the fixture 52, and in a state where elongated holes 52a made on the fixture 52 side are aligned with elongated holes 53a made on the fixture 53 side, the fitting bolts 55 are inserted through washers 54 into these elongated holes 52a, 53a and tightened with respect to the upper wall 41a of the suction chamber 40 so that the fixtures 52, 53 are fixed integrally. As shown in FIG. 4, upper wall 41a side female screws to be engaged with the fitting bolts 55 are constructed as blind screws in a rear plate 41e.

The elongated holes 52a are made for the purpose of changing the position of the fixture 53 so that elastic seal bodies 51 different in size can be fitted to the suction chamber 40. Further, the elongated holes 53a are for the purpose of adjusting the fitting position of the elastic seal member 50 to the suction chamber 40 in cooperation with the fixture 52 side elongated holes 52a.

The elastic seal body 51 is made of a foaming agent such as a polyimide foam having an excellent heat resistance, a high impact resilience and a less compressive permanent strain, and formed into a semicircular bar-like configuration in cross section, with its front surface being covered with a glass cloth (made by integrally adhering an aluminium foil through an adhesive to a glass cloth) coated with an aluminium foil. Further, as shown in FIG. 1, the elastic seal member 50 closes the portion between the T die 1 and the suction chamber 40 by coming into pressing contact with the T die 1 due to an elastic force.

The resin-made membrane formation casting apparatus according to the first embodiment of this invention is constructed as described above, a molten resin from a non-shown extruding machine is extruded through the T die 1 into a film-like or sheet-like membrane 2 and then caught on the outer circumferential surface of the casting roll 3.

At this time, the air within the suction chamber 40 is taken by the vacuum pump 5, so that the air in the close contact section between the membrane 2 and the casting roll 3 is sucked through the opening section 4a of the suction chamber 40. Whereupon, the pressure in the space in the vicinity of that close contact section drops to remove the air caught up into between the membrane 2 and the casting roll 3, which allows the membrane 2 made from a molten resin to be stably brought closely into contact with the casting roll 3.

Meanwhile, the attachment quantity of volatile matters such as a residual monomer, oligomer and additive onto the inner wall surface of the suction chamber 40 is affected by the inner wall surface temperature of the suction chamber 40. Although the free energy of a attaching substance (volatile matter) commonly tends to reduce with the attachment to the inner wall surface, raising the temperature of the inner wall surface of the suction chamber 40 can work against the reduction of the free energy due to the attachment, and the attachment becomes hard so that the attachment quantity decreases. Further, the attachment quantity decreases as the inner wall surface temperature of the suction chamber 40 rises, and reaches zero when exceeding some temperature (attachment suppressing temperature). Incidentally, the attachment suppressing temperature varies on the composition and concentration of the attaching substance (volatile matter), the coefficient of mass transfer to the inner wall surface, and others.

Thus, in the resin-made membrane formation casting apparatus according to the first embodiment, the temperature sensors 501 set in the interior of the housing 41 detect the surface temperature of the inner wall of the suction chamber 40, and the temperature controller 70 controls the heating wire type heaters 502 so that the inner wall surface temperature of the suction chamber 40 is kept above a volatile matter attachment suppressing temperature depending upon the composition and concentration of a volatile matter contained in air within the suction chamber 40, the coefficient of mass transfer of the inner wall surface and others, thus controlling the attachment of the volatile matter. Whereupon, no condensation of a volatile gas such as an additive generated as a volatile matter from the membrane 2 nor attachment thereof to the inner wall surface of the suction chamber 40 take place, but it goes out from the suction chamber 40 and the suction duct 60.

Furthermore, in the resin-made membrane formation casting apparatus according to the first embodiment, the suction chamber 40 is provided separately and despondently from the T die 1, and the suction chamber 40 is movable along the circumnferential direction of the casting roll 3 by means of the driving member 110 in a state where the necessary seal gap 40d is maintained with respect to the casting roll 3.

Accordingly, if the gap between the T die 1 and the casting roll 3 is large, the suction chamber 40 is shifted counter-clockwise around the roll supporting shaft 16 by the driving member 110 to advance up to a desired position and the suction inlet (opening section 40a) of the suction chamber 40 is brought close to the close-contact portion between the membrane 2 and the casting roll 3, thereby shortening the interval between the membrane 2 and the opening section 40a of the suction chamber 40. On the contrary, if the interval between the T die 1 and the casting roll 3 is small, the suction chamber 40 is shifted clockwise around the roll supporting shaft 16 by the driving member 110 to move back to a desired position.

Furthermore, at this time, since the suction chamber 40 is made along the outer circumferential surface of the casting roll 3, even if it is rotationally driven by the driving member 110, the necessary seal gap 40d is always maintainable between the suction chamber 40 and the outer circumferential surface of the casting roll 3. Whereupon, irrespective of the dimension of the gap between the T die 1 and the casting roll 3, a necessary pressure reduction level is securable in the pressure reduction space, and the pressure reduction in the space between the membrane 2 and the casting roll 3 can stably be accomplished by the suction chamber 40.

Still further, even if the gap (interval) between the T die 1 and the suction chamber 40 varies due to the variation of the dimension of the interval between the T die 1 and the casting roll 3 or the position of the suction chamber 40 as mentioned above, in this embodiment, the elastic seal member 50 is placed between the T die 1 and the suction chamber 40, and closes the gap between the T die 1 and the suction chamber 40 while following that variation. Whereupon, the airtightness in the pressure reduction space surrounded by the T die 1, the membrane 2 and the suction chamber 40 is maintainable, so that the necessary pressure reduction level in that pressure reduction space is certainly attainable.

Besides, it is also appropriate that the operation for the driving member 110 being rotationally driven around the roll supporting shaft 16 to make the suction chamber 40 take a rotating action is done manually, or that the operation is accomplished by a non-shown driving mechanism (drive motor).

In FIG. 1, the contour configuration (before deformation due to the extrusion from the T die 1) of the elastic seal member 50 before the movement of the suction chamber 40 is shown by a dashed line 50a.

In addition, in the case that the positional relationship between the T die 1 and the casting roll 3 is changed largely, the elastic seal member 50 itself is replaced with another with a different size, and adjustment is again done.

As mentioned above, with the resin-made membrane formation casting apparatus according to the first embodiment of this invention, the pressure reduction in the space between the membrane 2 and the casting roll 3 is stably achievable by the suction chamber 40 regardless of the dimension of the gap between the T die 1 and the casting roll 3, and the gap between the T die 1 and the casting roll 3 can adequately be set even in the case of any type of resin, with the result that a necessary film characteristic (membrane characteristic) is securable to sharply improve the quality of the resin-made membrane (film or sheet) 2.

Moreover, according to this embodiment, the elastic seal member 50 can more surely and automatically close the gap between the upper surface of the suction chamber 40 and the lower surface of the T die 1 even at the change of the position of the suction chamber 40, which allows the airtightness of the pressure reduction space surrounded by the T die 1, the membrane 2 and the suction chamber 40 to be securable to surely provide a necessary pressure reduction level in that pressure reduction space.

In addition, even at the positional adjustment of the suction chamber 40 for the optimal condition prior to the production running for each membrane (film, sheet) 2, the gap between the upper surface of the suction chamber 40 and the lower surface of the T die 1 can surely and automatically be sealed by the elastic seal member 50 irrespective of the change of the position of the suction chamber 40 as mentioned above, and therefore, it is possible to surely prevent the vibrations of the membrane 2 occurring because of the air flow into the suction chamber 40 through that gap and further to extremely facilitate the adjustment work. And, this permits the production running to continuously start immediately after the adjustment work.

Furthermore, with the casting apparatus according to this embodiment, an additive such as a slipping agent and an antistatic agent volatilizing from the membrane 2 (molten resin) is also sucked into the suction chamber 40 when the air in the close contact section between the membrane 2 and the casting roll 3 is taken by the suction chamber 40, and at this time, the inner wall surface temperature of the suction chamber 40 is kept by the temperature adjusting unit including the temperature sensors 501, the heating wire type heaters 502 and the temperature controller 70 to be above a volatile matter attachment suppressing temperature depending upon the composition and concentration of a volatile mater contained in the air within the suction chamber 40, the mass transfer coefficient of the inner wall surface and others. That is, the surface temperature of the inner wall of the suction chamber 40 is controllable without depending upon the suction gas quantity or the like in the suction chamber 40, so that the condensation of the volatile gas from the membrane 2 and the attachment thereof onto the inner wall surface of the suction chamber 40 are surely suppressible.

Accordingly, the condensed and attached volatile matter does not drop onto the casting roll 3, so that the contamination of membrane 2 is avoidable, which allows the formation of a high-quality resin-made membrane (film or sheet) 2.

Although in the above-described first embodiment the heating wire type heaters 502 are embedded in the interior of the housing 41, this invention is not limited to this, but it is also appropriate that a plate-like heating wire type heater (plate heater; see numeral 503 in FIG. 5) or a film-like heating wire type heater (see numeral 504 in FIG. 6) is embedded in the interior of the housing 41. This construction can also provide the same effects as those of the above-described first embodiment.

(B) Description of a Second Embodiment of the Invention

Figure 5:
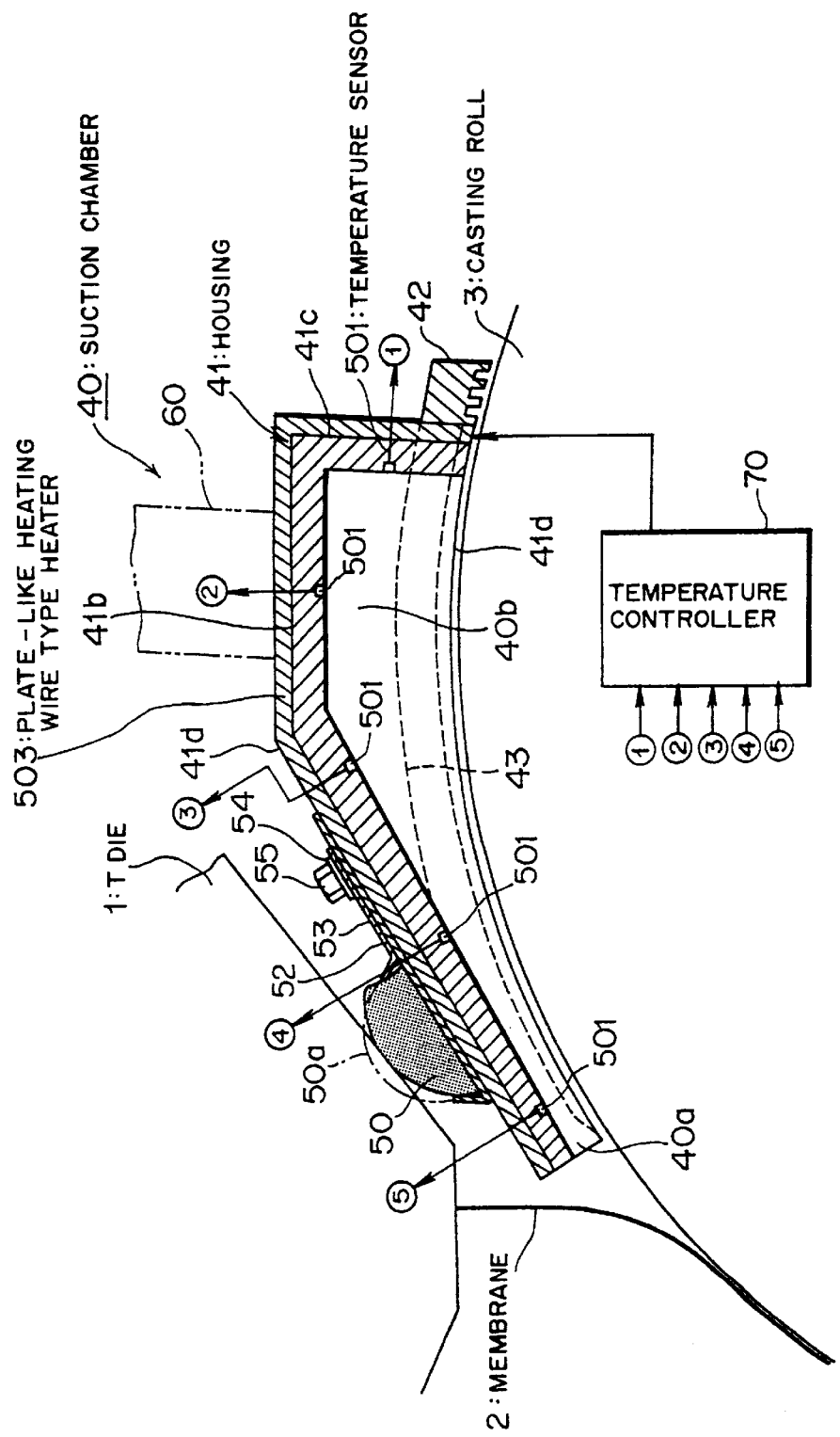
FIG. 5 is a side-elevational and cross-sectional view showing a suction chamber of a casting apparatus for formation of a resin-made membrane according to a second embodiment of the present invention, and further illustrating a control system thereof.

FIG. 5 illustrates a casting apparatus for formation of a resin-made membrane according to a second embodiment of this invention, and is a side-elevational and cross-sectional view showing its suction chamber, additionally including an illustration of its control system. In the resin-made membrane formation casting apparatus according to this second embodiment, in place of the heating wire type heaters 502 being embedded in the housing 41 of the suction chamber 40 in the FIG. 1 resin-made membrane formation casting apparatus according to the first embodiment, a plate-like heating wire type heater (plate heater) 503 is disposed along the outer wall surface of the housing 41 as shown in FIG. 5, and other parts are constructed like those of the resin-made membrane formation casting apparatus according to the first embodiment. In the illustration, the same numerals as those used in the above description signify the same or corresponding parts, and the description thereof will be omitted for brevity.

In this second embodiment, in addition to the plate-like heating wire type heater 503 serving as a heating means being provided along the outer wall surface of the housing 41 comprising the upper walls 41a, 41b, the rear wall 41c and the left- and right-hand side walls 41d constituting the suction chamber 40, temperature sensors 501 are set at a plurality of portions (5 in this embodiment) of the housing 41 corresponding to temperature-controlled zones in order to detect the inner wall surface temperature of the suction chamber 40.

As in the first embodiment, the temperature controller 70 receives information representative of the temperature sensed by the respective temperature sensors 501 as shown by arrows with circled numerals 1 to 5 in FIG. 5, and compares the temperature information with a given preset value, thereby accomplishing feedback control of the heating condition by the heating wire type heaters 503.

More specifically, in the second embodiment, a temperature adjusting unit is composed of the aforesaid temperature sensors 501, plate-like heating wire type heater 503 and temperature controller 70, where each of the temperature sensors 501 senses the inner wall surface temperature of the suction chamber 40 at every temperature-controlled zone on the inner wall of the suction chamber 40 while the temperature controller 70 controls, on the basis of the detection result, the heating condition by the plate-like heating wire type heater 503 at every temperature-controlled zone so that the inner wall surface temperature of the suction chamber 40 can be set to a desired value, that is, above a volatile matter attachment suppressing temperature (attachment suppressing temperature).

In the second embodiment, the elastic seal member 50 is fitted onto the outer circumferential surface of the plate-like heating wire type heater 503.

With the above-mentioned construction, even in the second embodiment, a molten resin from a non-shown extruding machine is extruded from the T die 1 into a film-like or sheet-like membrane 2 which in turn, is caught by the outer circumferential surface of the casting roll 3 to be subjected to cooling for formation.

At this time, in a manner that the air within the suction chamber 40 is sucked by the vacuum pump 5, the air in the close contact section between the membrane 2 and the casting roll 3 is taken through the opening section 40a of the suction chamber 40. Whereupon, the pressure reduction in the space near that close contact section takes place to drive out the air caught up into between the membrane 2 and the casting roll 3, so that the membrane 2 made of a molten resin can stably be brought closely into contact with the casting roll 3.

Furthermore, in the resin-made membrane formation casting apparatus according to the second embodiment, the temperature sensors 501 placed in the housing 41 detect the surface temperature of the inner wall of the suction chamber 40, and the temperature controller 70 controls the plate-like heating wire type heater 503 so that the inner wall surface temperature of the suction chamber 40 is kept to be above a volatile matter attachment suppressing temperature depending upon the composition and concentration of a volatile matter contained in the air within the suction chamber 40, the mass transfer coefficient of the inner wall surface and others, thereby suppressing the attachment of the volatile matter onto the inner wall surface of the suction chamber 40. Thus, the volatile gas such as an additive volatilizing from the membrane 2 is removable without condensing and attaching onto the inner wall of the suction chamber 40.

As described above, the resin-made membrane formation casting apparatus according to the second embodiment of this invention can offer the same effects as those of the above-described first embodiment, and further, since the heating means can more easily be provided in the housing 41 as compared with the case that the heating wire type heaters 502 are embedded in the housing 41, the apparatus is economically producible at a low cost.

Although in the above-described second embodiment the plate-like heating wire type heater 503 is provided along the outer wall surface of the housing 41, this invention is not limited to this, but it is also appropriate that a sheathed heater or a film-like heating wire type heater is placed along the outer wall surface of the housing 41. Even in this case, the same effects as those of the second embodiment are attainable.

(C) Description of a Third Embodiment of the Invention

Figure 6:
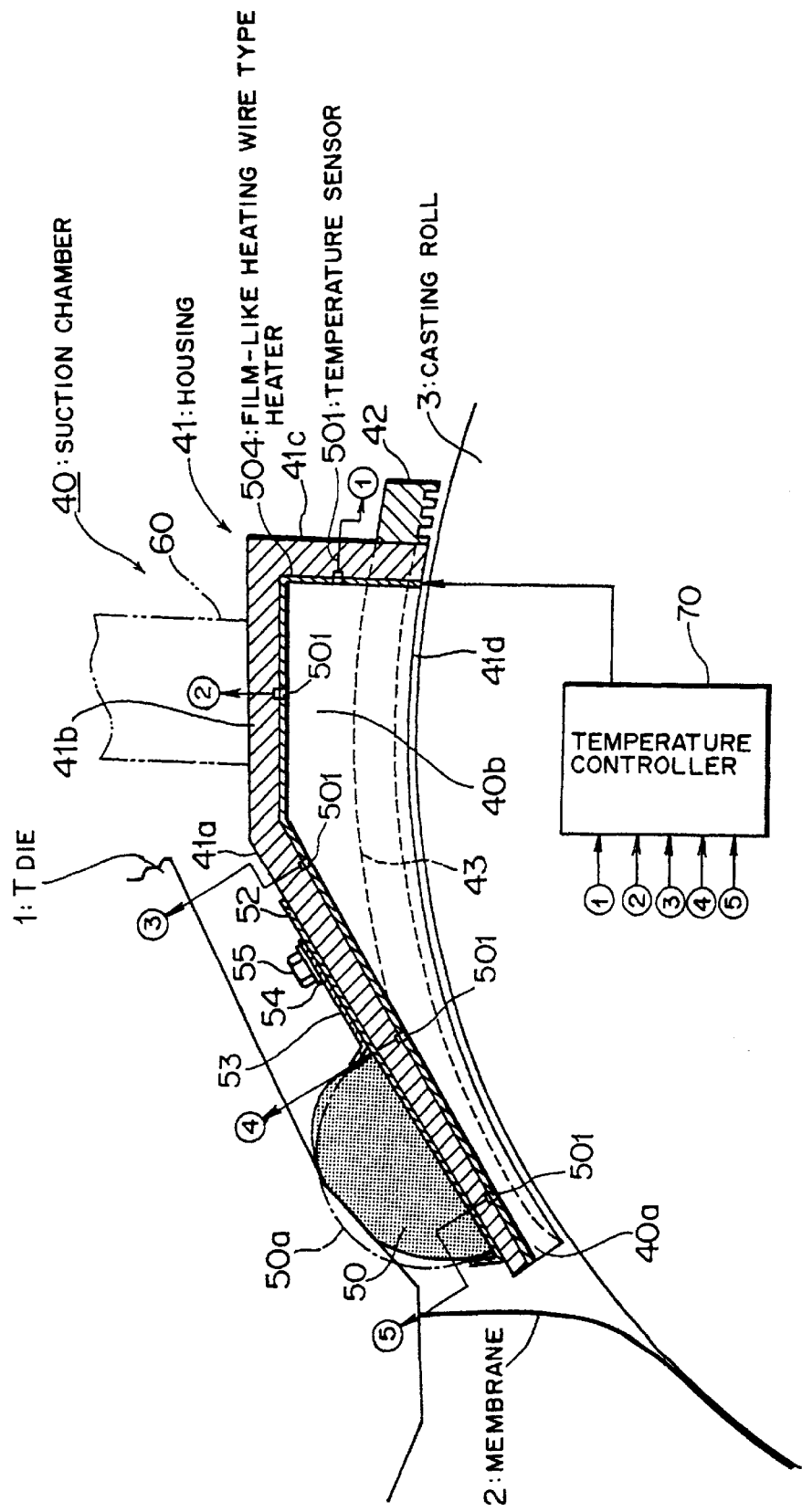
FIG. 6 is a side-elevational and cross-sectional view showing a suction chamber of a casting apparatus for formation of a resin-made membrane according to a third embodiment of the present invention, and further illustrating a control system thereof.

FIG. 6 shows a casting apparatus for formation of a resin-made membrane according to a third embodiment of this invention, and is a side-elevational and cross-sectional view showing its suction chamber, additionally including an illustration of its control system. In the resin-made membrane formation casting apparatus according to this third embodiment, in place of the plate-like heating wire type heater 503 being placed outside the housing 41 of the suction chamber 40 in the FIG. 5 resin-made membrane formation casting apparatus according to the second embodiment, a film-like heating wire type heater 504 is disposed inside the housing 41 to make the inner wall surface of the suction chamber 40 as shown in FIG. 6, and other parts are constructed like those of the resin-made membrane formation casting apparatus according to the first and second embodiments. In the illustration, the same numerals as those used in the above description signify the same or corresponding parts, and the description thereof will be omitted for simplicity.

In this third embodiment, the film-like heating wire type heater 504 acting as a heating means is provided inside the housing 41 comprising the upper walls 41a, 41b, the rear wall 41c and the left- and right-hand side walls 41d composing the suction chamber 40 to form the inner wall surface of the suction chamber 40, and temperature sensors 501 are set at a plurality of portions (5 in this embodiment) of the housing 41 corresponding to temperature-controlled zones to detect the inner wall surface temperature of the suction chamber 40 (the inner surface temperature of the film-like heating wire type heater 504).

As in the first and second embodiments, the temperature controller 70 receives information representative of the temperature sensed by the respective temperature sensors 501 as shown by arrows with circled numerals 1 to 5 in FIG. 6, and compares the temperature information with a given preset value, thereby accomplishing feedback control of the heating condition by the heating wire type heaters 504.

More specifically, in the third embodiment, a temperature adjusting unit is composed of the aforesaid temperature sensors 501, film-like heating wire type heater 504 and temperature controller 70, where each of the temperature sensors 501 senses the inner wall surface temperature of the suction chamber 40 (that is, the inner surface temperature of the film-like heating wire type heater 504) at every temperature-controlled zone on the inner wall of the suction chamber 40 while the temperature controller 70 controls, on the basis of the detection result, the heating condition by the film-like heating wire type heater 504 at every temperature-controlled zone so that the inner wall surface temperature of the suction chamber 40 can be set to a desired value, that is, above a volatile matter attachment suppressing temperature (attachment suppressing temperature).

With the above-mentioned construction, even in the third embodiment, a molten resin from a non-shown extruding machine is extruded from the T die 1 into a film-like or sheet-like membrane 2 which in turn, is caught by the outer circumferential surface of the casting roll 3 to be subjected to cooling for formation.

At this time, in a manner that the air within the suction chamber 40 is sucked by the vacuum pump 5, the air in the close contact section between the membrane 2 and the casting roll 3 is taken through the opening section 40a of the suction chamber 40. Whereupon, the pressure reduction in the space near that close contact section takes place to drive out the air caught up into between the membrane 2 and the casting roll 3, so that the membrane 2 made of a molten resin can stably be brought closely into contact with the casting roll 3.

Furthermore, in the resin-made membrane formation casting apparatus according to the third embodiment, the temperature sensors 501 placed in the housing 41 detect the surface temperature of the inner wall of the suction chamber 40, and the temperature controller 70 controls the film-like heating wire type heater 504 so that the inner wall surface temperature of the suction chamber 40 (that is, the inner surface temperature of the film-like heating wire type heater 504) is kept to be above a volatile matter attachment suppressing temperature depending upon the composition and concentration of the volatile matter contained in the air within the suction chamber 40, the mass transfer coefficient of the inner wall surface and others, thereby suppressing the attachment of the volatile matter onto the inner wall surface of the suction chamber 40. Thus, the volatile gas such as an additive volatilizing from the membrane 2 is removable without condensing and attaching onto the inner wall of the suction chamber 40.

As described above, the resin-made membrane formation casting apparatus according to the third embodiment of this invention can offer the same effects as those of the above-described second embodiment, and since the temperature of the inner wall surface of the housing 41 is measured by the temperature sensors 501 and the film-like heating wire type heater 504 placed on the inner wall surface of the housing 41 is controlled by the temperature controller 70, the temperature of the inner wall surface of the housing 41 is directly controllable and is more certainly adjustable, which allows more certain suppression of the condensation and attachment onto the inner wall of the suction chamber 40.

Although in the above-described third embodiment the film-like heating wire type heater 504 is provided inside the housing 41 to constitute the inner wall surface of the suction chamber 40, this invention is not limited to this, and it is also appropriate that a plate heater is provided inside the housing 41 to make the inner wall surface of the suction chamber 40 or a sheathed heater is adhered to the inside of the housing 41. Even in either case, the same effects as those of the third embodiment are attainable.

(D) Description of a Fourth Embodiment of the Invention

Figure 7:
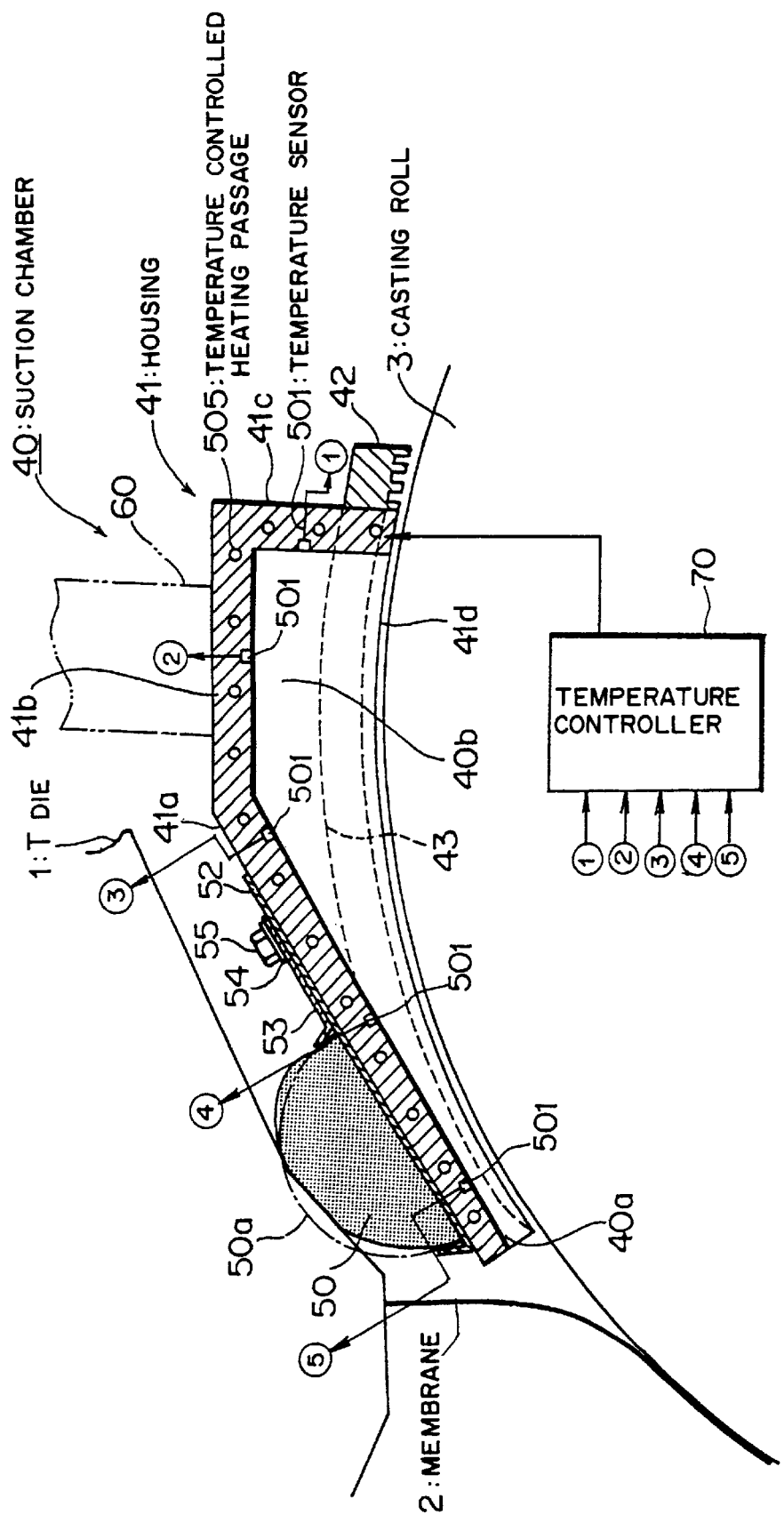
FIG. 7 is a side-elevational and cross-sectional view showing a suction chamber of a casting apparatus for formation of a resin-made membrane according to a fourth embodiment of the present invention, and further illustrating a control system thereof.

FIG. 7 illustrates a casting apparatus for formation of a resin-made membrane according to a fourth embodiment of this invention, and is a side-elevational and cross-sectional view showing its suction chamber, additionally including an illustration of its control system. In the resin-made membrane formation casting apparatus according to this fourth embodiment, in place of the heating wire type heaters 502 being embedded in the housing 41 of the suction chamber 40 in the FIG. 1 resin-made membrane formation casting apparatus according to the first embodiment, as shown in FIG. 7, temperature-controlled heating passages (fluid passages) 505 are made in the housing 41 and a temperature-controlled heating medium is provided which is movable within the temperature-controlled heating passages 505, and other parts are constructed like those of the resin-made membrane formation casting apparatus according to the first to third embodiments. In the illustration, the same numerals as those used in the above description signify the same or corresponding parts, and the description thereof will be omitted for brevity.

In this fourth embodiment, the temperature-controlled heating passages 505 are made in the housing 41 comprising the upper walls 41a, 41b, the rear wall 41c and the left- and right-hand side walls 41d constituting the suction chamber 40, with they being arranged at a nearly equal interval along the respective wall members (that is, the upper walls 41a, 41b, the rear wall 41c and the left- and right-hand side walls 41d) forming structural members of the housing 41, and the temperature-controlled heating medium (not shown) is made to travel within the temperature-controlled heating passages 505. In addition, temperature sensors 501 for detecting the inner wall surface temperature of the suction chamber 40 are set at a plurality of (5 in this embodiment) portions of the housing 41 corresponding to temperature-controlled zones.

As in the first to third embodiments, the temperature controller 70 receives information representative of the temperature sensed by the respective temperature sensors 501 as shown by arrows with circled numerals 1 to 5 in FIG. 7, and compares the temperature information with a given preset value, thereby accomplishing feedback control of the heating condition by the temperature-controlled heating medium in the temperature-controlled heating passages 505.

More specifically, in the fourth embodiment, a temperature adjusting unit is composed of a heating means comprising the temperature-controlled heating passages 505 and the temperature-controlled heating medium and further comprising the temperature sensors 501 and the temperature controller 70, where each of the temperature sensors 501 senses the inner wall surface temperature of the suction chamber 40 at every temperature-controlled zone on the inner wall of the suction chamber 40 while the temperature controller 70 controls, on the basis of the detection result, the temperature of the temperature-controlled heating medium traveling in the temperature-controlled heating passages 505 or the flow rate thereof so that the inner wall surface temperature of the suction chamber 40 can be set to a desired value, that is, above a volatile matter attachment suppressing temperature (attachment suppressing temperature).

With the above-mentioned construction, even in the fourth embodiment, a molten resin from a non-shown extruding machine is extruded from the T die 1 into a film-like or sheet-like membrane 2 which in turn, is caught by the outer circumferential surface of the casting roll 3 to be subjected to cooling for formation.

At this time, in a manner that the air within the suction chamber 40 is sucked by the vacuum pump 5, the air in the close contact section between the membrane 2 and the casting roll 3 is taken through the opening section 40a of the suction chamber 40. Whereupon, the pressure reduction in the space near that close contact section takes place to drive out the air caught up into between the membrane 2 and the casting roll 3, so that the membrane 2 made of a molten resin can stably be brought closely into contact with the casting roll 3.

Furthermore, in the resin-made membrane formation casting apparatus according to the fourth embodiment, the temperature sensors 501 placed in the housing 41 detect the surface temperature of the inner wall of the suction chamber 40, and the temperature controller 70 controls the temperature of the temperature-controlled heating medium traveling within the temperature-controlled heating passages 505 or the flow rate thereof so that the inner wall surface temperature of the suction chamber 40 is kept to be above a volatile matter attachment suppressing temperature depending upon the composition and concentration of the volatile matter contained in the air within the suction chamber 40, the mass transfer coefficient of the inner wall surface and others, thereby suppressing the attachment of the volatile matter onto the inner wall surface of the suction chamber 40. Thus, the volatile gas such as an additive volatilizing from the membrane 2 is removable without condensing and attaching onto the inner wall of the suction chamber 40.

As described above, the resin-made membrane formation casting apparatus according to the fourth embodiment of this invention can offer the same effects as those of the above-described first embodiment because the temperature of the temperature-controlled heating medium placed within the temperature-controlled heating passages 505 can be changed so that the temperature of the inner wall surface of the suction chamber 40 is adjusted to a desired value.

Incidentally, for putting this embodiment into practice, it is desirable to add, for example, a temperature-controlled heating medium supplying means for supplying the temperature-controlled heating medium into the temperature-controlled heating passages 505 or a temperature-controlled heating medium temperature adjusting means for adjusting and maintaining the temperature of the temperature-controlled heating medium to a given value.

(E) Description of a Fifth Embodiment of the Invention

Figure 8:
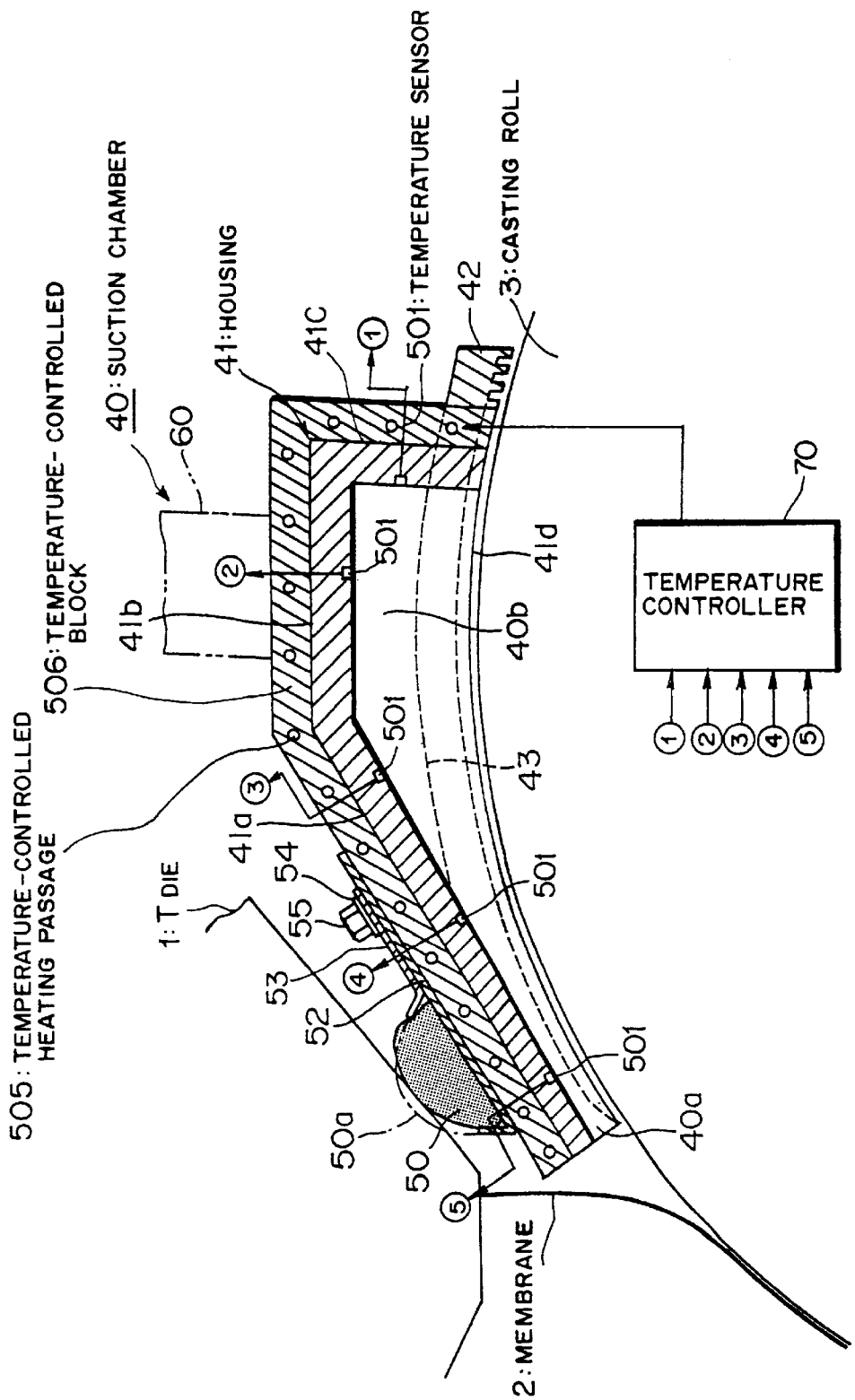
FIG. 8 is a side-elevational and cross-sectional view showing a suction chamber of a casting apparatus for formation of a resin-made membrane according to a fifth embodiment of the present invention, and further illustrating a control system thereof.

FIG. 8 illustrates a casting apparatus for formation of a resin-made membrane according to a fifth embodiment of this invention, and is a side-elevational and cross-sectional view showing its suction chamber, additionally including an illustration of its control system. In the resin-made membrane formation casting apparatus according to this fifth embodiment, as shown in FIG. 8, the heating wire type heaters 502 are removed from the housing 41 of the suction chamber 40 in the FIG. 1 resin-made membrane formation casting apparatus according to the first embodiment, whereas a temperature-controlled block 506 having temperature-controlled heating passages (fluid passages) 505 therein is placed outside the housing 41, with a temperature-controlled heating medium being provided to be movable within the temperature-controlled heating passages 505. The other parts are constructed like those of the resin-made membrane formation casting apparatus according to the first embodiment. In the illustration, the same numerals as those used in the above description signify the same or corresponding parts, which will be omitted from the description for brevity.

In this fifth embodiment, temperature sensors 501 are set at a plurality of (5 in this embodiment) portions of the housing 41 comprising the upper walls 41a, 41b, the rear wall 41c and the left- and right-hand side walls 41d constituting the suction chamber 40 corresponding to temperature-controlled zones in order to detect the inner wall surface temperature of the suction chamber 40.

In addition, the temperature-controlled block 506 is disposed over the entire outer wall surface of the suction chamber 40 to be brought closely into the outer surface of the housing 41, and in the temperature-controlled block 506, the temperature-controlled heating passages 505 are made at a nearly equal interval along the respective wall members (that is, the upper walls 41a, 41b, the rear wall 41c and the left- and right-hand side walls 41d) forming the structural members of the housing 41, and the temperature-controlled heating medium (not shown) is designed to travel within the temperature-controlled heating passages 505.

As well as the first to fourth embodiments, the temperature controller 70 receives information representative of the temperature sensed by the respective temperature sensors 501 as shown by arrows with circled numerals 1 to 5 in FIG. 8, and compares the temperature information with a given preset value, thereby accomplishing feedback control of the heating condition by the temperature-controlled heating medium in the temperature-controlled heating passages 505.

More specifically, in the fifth embodiment, a temperature adjusting unit is composed of a heating means (the temperature-controlled heating passages 505 and the temperature-controlled heating medium) within the temperature-controlled block 506, the temperature sensors 501 and the temperature controller 70, where each of the temperature sensors 501 senses the inner wall surface temperature of the suction chamber 40 at every temperature-controlled zone on the inner wall of the suction chamber 40 while the temperature controller 70 controls, on the basis of the detection result, the flow rate or temperature of the temperature-controlled heating medium placed in the temperature-controlled heating passages 505 so that the inner wall surface temperature of the suction chamber 40 can be set to a desired value, that is, above a volatile matter attachment suppressing temperature (attachment suppressing temperature).

Besides, in the fifth embodiment, the elastic seal member 50 is mounted on the outer circumferential surface of the temperature-controlled block 506.

With the above-mentioned construction, even in the fifth embodiment, a molten resin from a non-shown extruding machine is extruded from the T die 1 into a film-like or sheet-like membrane 2 which in turn, is caught by the outer circumferential surface of the casting roll 3 to be subjected to cooling for formation.

At this time, in a manner that the air within the suction chamber 40 is sucked by the vacuum pump 5, the air in the close contact section between the membrane 2 and the casting roll 3 is taken through the opening section 40a of the suction chamber 40. Whereupon, the pressure reduction in the space near that close contact section takes place to drive out the air caught up into between the membrane 2 and the casting roll 3, so that the membrane 2 made of a molten resin can stably be brought closely into contact with the casting roll 3.

Furthermore, in the resin-made membrane formation casting apparatus according to the fifth embodiment, the temperature sensors 501 placed in the housing 41 detect the surface temperature of the inner wall of the suction chamber 40, and the temperature controller 70 controls the flow rate or temperature of the temperature-controlled heating medium situated within the temperature-controlled heating passages 505 so that the inner wall surface temperature of the suction chamber 40 is kept to be above a volatile matter attachment suppressing temperature depending upon the composition and concentration of the volatile matter contained in the air within the suction chamber 40, the mass transfer coefficient of the inner wall surface and others, thereby suppressing the attachment of the volatile matter onto the inner wall surface of the suction chamber 40. Thus, the volatile gas such as an additive volatilizing from the membrane 2 is removable without condensing and attaching onto the inner wall of the suction chamber 40.

As described above, the resin-made membrane formation casting apparatus according to the fifth embodiment of this invention can offer the same effects as those of the above-described fourth embodiment, and since the heating means is set on the temperature-controlled block 506 placed closely into contact with the surface of the housing 41, the heating means can be disposed with a simple structure so that the apparatus is economically producible at a low cost.

Incidentally, for putting this embodiment into practice, it is desirable to add, for example, a temperature-controlled heating medium supplying means for supplying the temperature-controlled heating medium into the temperature-controlled heating passages 505 or a temperature-controlled heating medium temperature adjusting means for adjusting and maintaining the temperature of the temperature-controlled heating medium to a given value.

(F) Description of a Sixth Embodiment of the Invention

Figure 9:
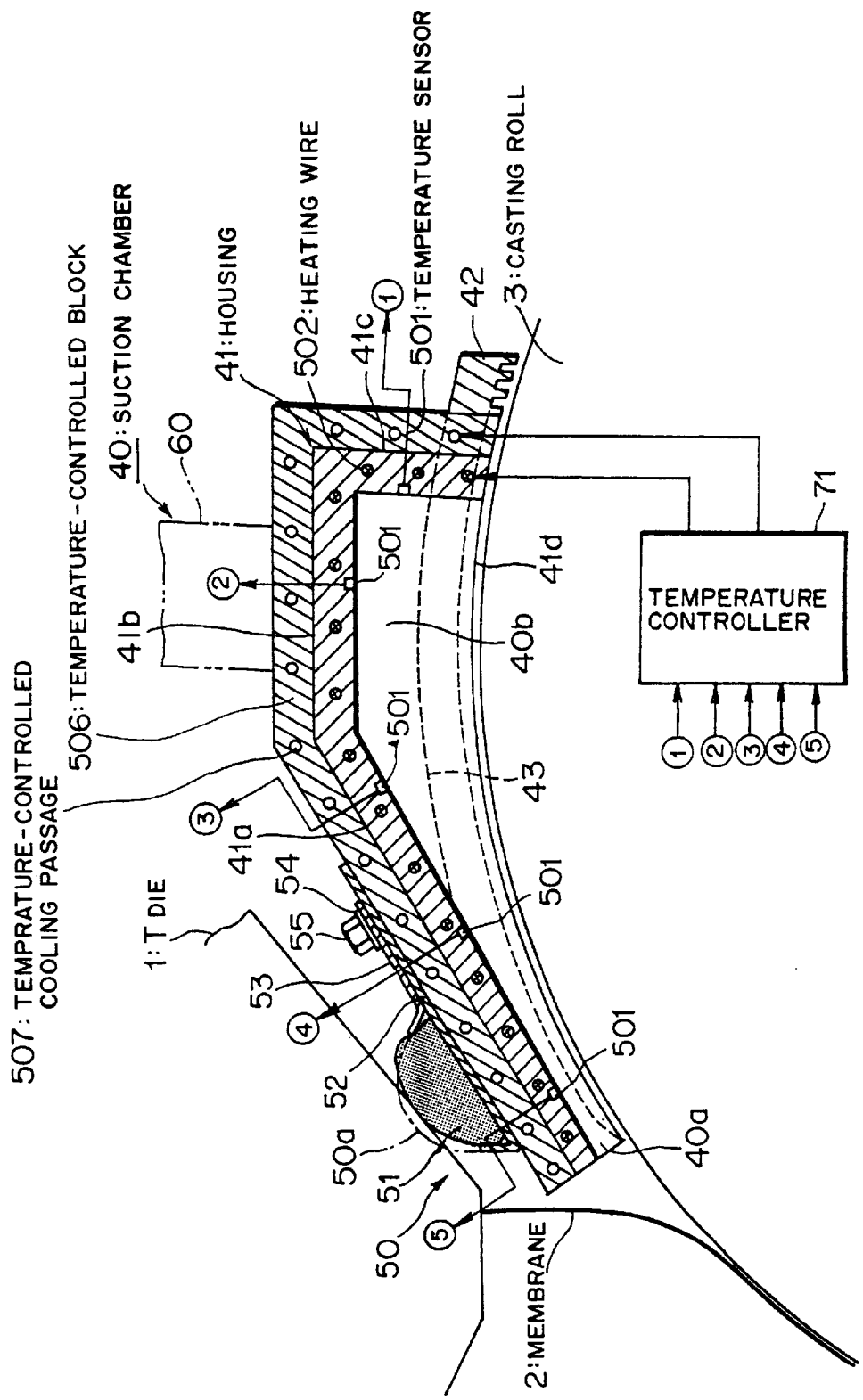
FIG. 9 is a side-elevational and cross-sectional view showing a suction chamber of a casting apparatus for formation of a resin-made membrane according to a sixth embodiment of the present invention, and further illustrating a control system thereof.

FIG. 9 illustrates a casting apparatus for formation of a resin-made membrane according to a sixth embodiment of this invention, and is a side-elevational and cross-sectional view showing its suction chamber, additionally including an illustration of its control system. In the resin-made membrane formation casting apparatus according to this sixth embodiment, as shown in FIG. 9, a temperature-controlled block 506 having temperature-controlled cooling passages (fluid passages) 507 therein is placed outside the housing 41 of the suction chamber 40 in the FIG. 1 resin-made membrane formation casting apparatus according to the first embodiment, with a temperature-controlled cooling medium (not shown) being provided to be movable within the temperature-controlled cooling passages 507, and a temperature controller 71 is provided. The other parts are constructed like those of the resin-made membrane formation casting apparatus according to the first embodiment. In the illustration, the same numerals as those used in the above description signify the same or corresponding parts, which will be omitted from the description for simplicity.

In this sixth embodiment, as in the case of the first embodiment, heating wire type heaters 502 being heating means are embedded in the housing 41 comprising the upper walls 41a, 41b, the rear wall 41c and the left- and right-hand side walls 41d constituting the suction chamber 40 to be arranged at a nearly equal interval throughout the entire width of the suction chamber 40, and further, temperature sensors for sensing the inner wall surface temperature of the suction chamber 40 are placed at a plurality of portions (5 in this embodiment) of the housing 41 corresponding to temperature-controlled zones.

Further, the temperature controller 71 receives information representative of the temperature sensed by the respective temperature sensors 501 as shown by arrows with circled numerals 1 to 5 in FIG. 9, and compares the temperature information with a given preset value to control the heating condition by the heating wire type heaters 502 and further to control the flow rate or temperature of a temperature-controlled cooling medium movably placed within the temperature-controlled cooling passages 507.

Still further, as well as the fifth embodiment, the temperature-controlled block 506 is disposed over the entire outer wall surface of the suction chamber 40 to be brought closely into the outer surface of the housing 41, and in the temperature-controlled block 506, the temperature-controlled cooling passages 507 are made at a nearly equal interval along the respective wall members (that is, the upper walls 41a, 41b, the rear wall 41c and the left- and right-hand side walls 41d) forming the structural members of the housing 41, and the temperature-controlled cooling medium (not shown) is designed to travel within the temperature-controlled cooling passages 507.

More specifically, in the sixth embodiment, a temperature adjusting unit is composed of a cooling means (the temperature-controlled cooling passages 507 and the temperature-controlled cooling medium) within the temperature-controlled block 506, the temperature sensors 501, the heating wire type heaters 502 and the temperature controller 71, where each of the temperature sensors 501 senses the inner wall surface temperature of the suction chamber 40 at every temperature-controlled zone on the inner wall of the suction chamber 40 while the temperature controller 71 controls, on the basis of the detection result, the flow rate or temperature of the temperature-controlled cooling medium and the heating condition by the heating wire type heaters 502 so that the inner wall surface temperature of the suction chamber 40 can be set to a desired value, that is, above a volatile matter attachment suppressing temperature (attachment suppressing temperature).

A description will be made hereinbelow of one example of control methods for the inner wall surface temperature of the suction chamber 40 by the temperature controller 71. When the inner wall surface temperature of the suction chamber 40 measured by the temperature sensors 501 becomes higher than the preset temperature as a result of the detection, the temperature controller 71 stops the heating by the heating wire type heaters 502 while increasing the flow rate of the temperature-controlled cooling medium placed within the temperature-controlled cooling passages 507 or lowering the temperature thereof so that the inner wall surface temperature of the suction chamber 40 drops.

On the other hand, when the detection result shows that the inner wall surface temperature of the suction chamber 40 obtained by the temperature sensors 501 becomes below the preset temperature, the temperature controller 71 starts the heating by the heating wire type heaters 502 while restraining the flow rate of the temperature-controlled cooling medium within the temperature-controlled cooling passages 507 or raising the temperature of the temperature-controlled cooling medium, thereby making the inner wall surface temperature of the suction chamber 40 higher.

In detail, through the repetition of the control processes by the temperature controller 71, the inner wall surface of the suction chamber 40 is converged to a given temperature set previously in the temperature controller 71 and maintained at that value.

Incidentally, in the sixth embodiment, the elastic seal member 50 is mounted on the outer circumferential surface of the temperature-controlled block 506.

With the above-mentioned construction, even in the sixth embodiment, a molten resin from a non-shown extruding machine is extruded from the T die 1 into a film-like or sheet-like membrane 2 which in turn, is caught by the outer circumferential surface of the casting roll 3 to be subjected to cooling for formation.

At this time, in a manner that the air within the suction chamber 40 is sucked by the vacuum pump 5, the air in the close contact section between the membrane 2 and the casting roll 3 is taken through the opening section 40a of the suction chamber 40. Whereupon, the pressure reduction in the space near that close contact section takes place to drive out the air caught up into between the membrane 2 and the casting roll 3, so that the membrane 2 made of a molten resin can stably be brought closely into contact with the casting roll 3.

Furthermore, in the resin-made membrane formation casting apparatus according to the sixth embodiment, the temperature sensors 501 placed in the housing 41 detect the surface temperature of the inner wall of the suction chamber 40, and the temperature controller 71 controls the heating by the heating wire type heaters 502 or the flow rate or temperature of the temperature-controlled cooling medium so that the inner wall surface temperature of the suction chamber 40 is kept to be above a volatile matter attachment suppressing temperature depending upon the composition and concentration of the volatile matter contained in the air within the suction chamber 40, the mass transfer coefficient of the inner wall surface and others, thereby suppressing the attachment of the volatile matter onto the inner wall surface of the suction chamber 40. Thus, the volatile gas such as an additive volatilizing from the membrane 2 is removable without condensing and attaching onto the inner wall of the suction chamber 40.

As described above, the resin-made membrane formation casting apparatus according to the sixth embodiment of this invention can offer the same effects as those of the above-described first embodiment, and since the housing 41 can be cooled by the temperature-controlled cooling medium traveling within the temperature-controlled cooling passages 507, the control time required for the temperature control of the housing 41 becomes short and the temperature adjustment becomes possible with a high accuracy.

Incidentally, for putting this embodiment into practice, it is desirable to add, for example, a temperature-controlled cooling medium supplying means for supplying the temperature-controlled cooling medium into the temperature-controlled cooling passages 507 or a temperature-controlled cooling medium temperature adjusting means for adjusting and maintaining the temperature of the temperature-controlled cooling medium to a given value.

Although in the above-described sixth embodiment the temperature controller 71 controls both the heating wire type heaters 502 and temperature-controlled cooling medium for the control of the inner wall surface temperature of the suction chamber 40, this invention is not limited to this, and it is also appropriate that the inner wall surface temperature of the suction chamber 40 is controlled by the control of the flow rate or temperature of the temperature-controlled cooling medium in a state where the heating by the heating wire type heaters 502 remains uniform, or the inner wall surface temperature of the suction chamber 40 is controlled by the control of the heating by the heating wire type heaters 502 while the flow rate or temperature of the temperature-controlled cooling medium is kept constant. In either case, the same effects as those of the sixth embodiment are obtainable.

Furthermore, although in the above-described sixth embodiment the heating wire type heaters 502 embedded in the interior of the housing 41 are used as the heating means, this invention is not limited to this, it is also appropriate that the plate-like heating wire type heater 503 shown in FIG. 5 or the film-like heating wire type heater 504 shown in FIG. 6 is placed along the outer wall surface of the housing 41 or is set inside the housing 41 to constitute the inner wall surface of the suction chamber 40, or the temperature-controlled heating medium is movably provided within the temperature-controlled heating passages 505 disposed along the interior of the suction chamber 41 as shown in FIG. 7. In either case, the same effects as those of the sixth embodiment are obtainable.

(G) Description of a Seventh Embodiment of the Invention

Figure 10:
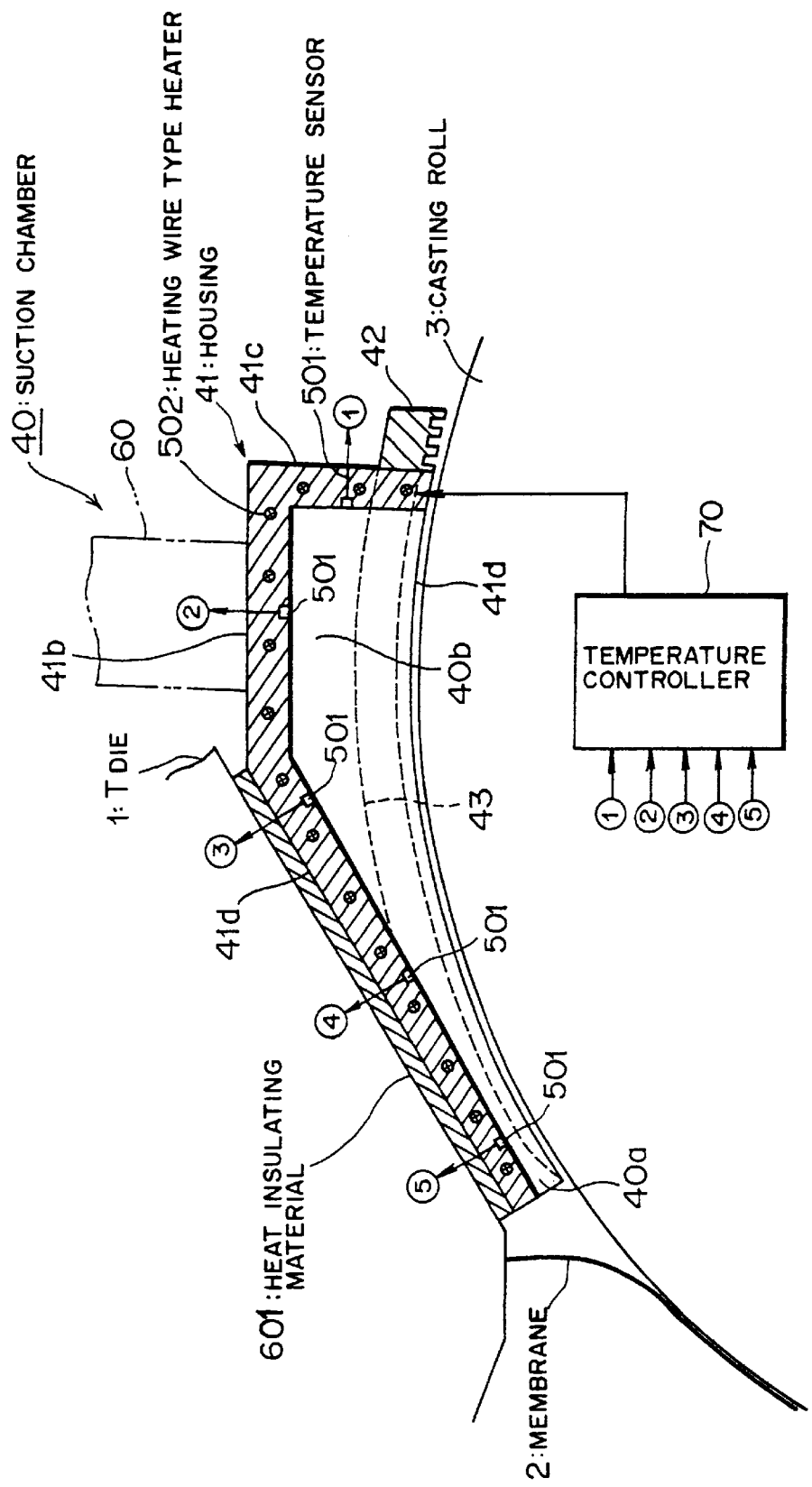
FIG. 10 is a side-elevational and cross-sectional view showing a suction chamber of a casting apparatus for formation of a resin-made membrane according to a seventh embodiment of the present invention, and further illustrating a control system thereof.
Figure 11:
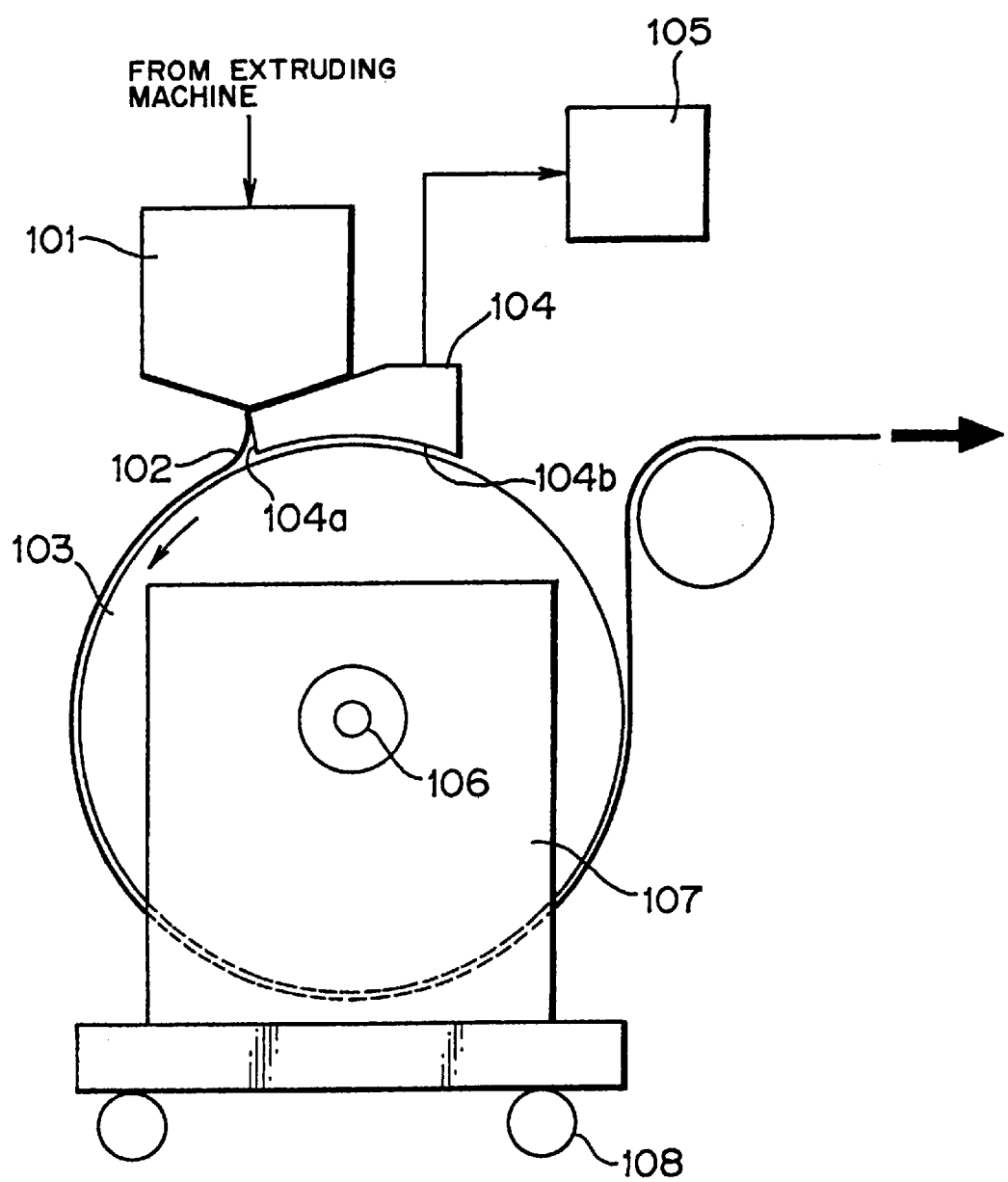
FIG. 11 is a side elevational view illustratively showing a prior resin-made membrane formation casting apparatus.
Figure 12:
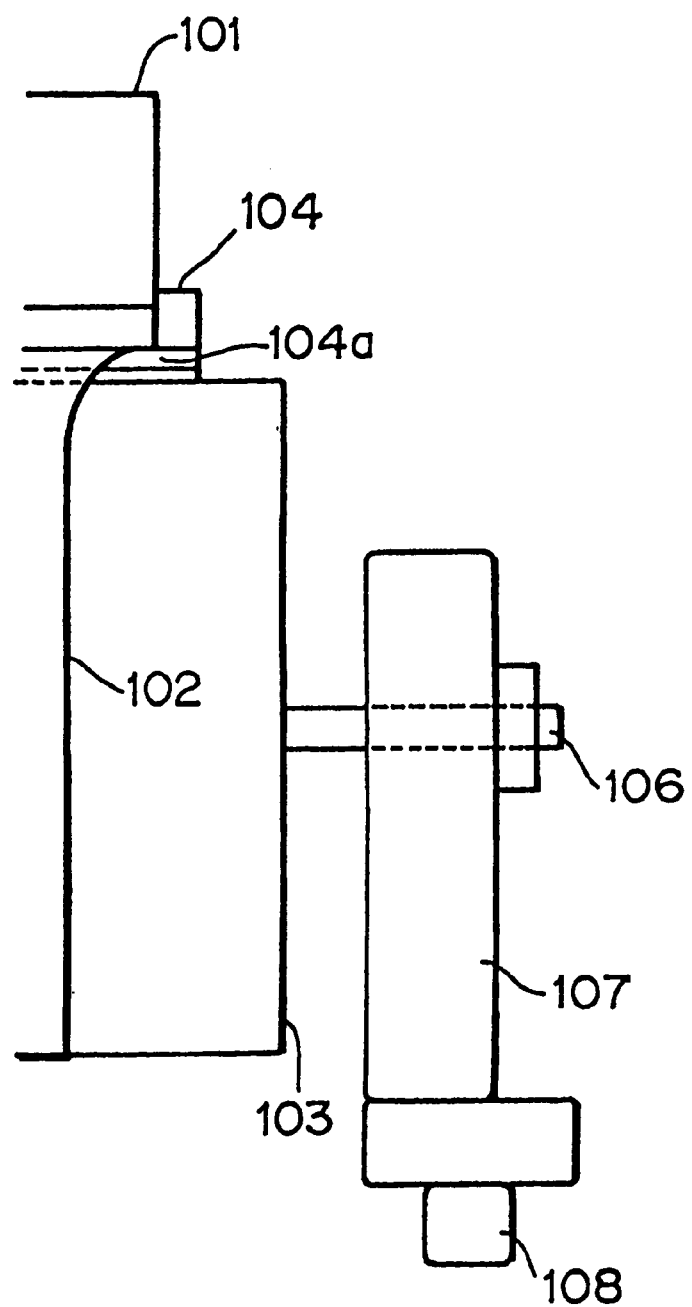
FIG. 12 is a front elevational view illustratively showing the prior resin-made membrane formation casting apparatus.

FIG. 10 illustrates a casting apparatus for formation of a resin-made membrane according to a seventh embodiment of this invention, and is a side-elevational and cross-sectional view showing its suction chamber, additionally including an illustration of its control system. In the resin-made membrane formation casting apparatus according to this seventh embodiment, the elastic seal member 50 and others are removed from the FIG. 1 casting apparatus according to the first embodiment, and as shown in FIG. 10, the suction chamber 40 is fixedly secured through a heat insulating material 601 to one side surface of the T die 1. The other parts are constructed like those of the resin-made membrane formation casting apparatus according to the first embodiment. In the illustration, the same numerals as those used in the above description signify the same or corresponding parts, which will be omitted from the description for simplicity.

In the apparatus according to the seventh embodiment, the suction chamber 40 is not made to be movable along the circumferential directions of the casting roll 3.

Furthermore, the heat insulating material 601 is placed between the T die 1 and the upper wall 41a of the suction chamber 40 to suppress the cooling of the side surface of the T die 1 occurring through the upper wall 41a of the suction chamber 40 owing to the heat transfer between the sucked air flows and the inner wall surface of the suction chamber 40.

With the above-mentioned construction, even in the seventh embodiment, a molten resin from a non-shown extruding machine is extruded from the T die 1 into a film-like or sheet-like membrane 2 which in turn, is caught by the outer circumferential surface of the casting roll 3 to be subjected to cooling for formation.

At this time, in a manner that the air within the suction chamber 40 is sucked by the vacuum pump 5, the air in the close contact section between the membrane 2 and the casting roll 3 is taken through the opening section 40a of the suction chamber 40. Whereupon, the pressure reduction in the space near that close contact section takes place to drive out the air caught up into between the membrane 2 and the casting roll 3, so that the membrane 2 made of a molten resin can stably be brought closely into contact with the casting roll 3.

Furthermore, in the resin-made membrane formation casting apparatus according to the seventh embodiment, as well as the first embodiment, the temperature sensors 501 placed in the housing 41 detect the surface temperature of the inner wall of the suction chamber 40, and the temperature controller 70 controls the heating wire type heaters 502 so that the inner wall surface temperature of the suction chamber 40 is kept to be above a volatile matter attachment suppressing temperature (attachment suppressing temperature) depending upon the composition and concentration of the volatile matter contained in the air within the suction chamber 40, the mass transfer coefficient of the inner wall surface and others, thereby suppressing the attachment of the volatile matter onto the inner wall surface of the suction chamber 40. Thus, the volatile gas such as an additive volatilizing from the membrane 2 is removable without condensing and attaching onto the inner wall of the suction chamber 40.

As described above, the resin-made membrane formation casting apparatus according to the seventh embodiment of this invention can offer the same effects as those of the above-described first embodiment, and the apparatus can be manufactured with a simple structure, which results in low-cost production of the apparatus.

Although in the above-described seventh embodiment the heating wire type heaters 502 embedded in the interior of the housing 41 are employed as the heating means, this invention is not limited to this, and it is also appropriate that the plate-like heating wire type heater 503 shown in FIG. 5 or the film-like heating wire type heater 504 shown in FIG. 6 is placed along the outer wall surface of the housing 41 or is set inside the housing 41 to constitute the inner wall surface of the suction chamber 40, or the temperature-controlled heating medium is movably provided within the temperature-controlled heating passages 505 disposed along the interior of the suction chamber 41 as shown in FIG. 7. In either case, the same effects as those of the seventh embodiment are obtainable.

(H) Others

The present invention is not limited to the above-described embodiments, and it is intended to cover all changes and modifications of the embodiments of the invention herein used for the purpose of the disclosure, which do not constitute departures from the spirit and scope of the invention.

For instance, although in the above-described embodiments the elastic seal member 50 is mounted on the upper surface of the suction chamber 40, this invention is not limited to this, it is also possible that the elastic seal member 50 is mounted on the lower surface of the T die 1 to be elastically pressed into contact with the upper surface side of the suction chamber 40.

Furthermore, although in the foregoing embodiments the elastic seal member 50 is made of a foaming agent to have a semicircular bar-like configuration in cross section and its front surface is covered with a glass cloth coated with an aluminium foil, this invention is not within this limitation, it is also possible to use a plate spring which is inflated into an arc shape and turned.

Still further, although in the foregoing embodiments the temperature sensors are disposed at 5 portions of the housing 41, this invention is not within this limitation, any number of temperature sensors can be provided if necessary, and no limitation is imposed on their locations.

In addition, although in the foregoing embodiments not only the temperature-controlled heating passages and the temperature-controlled heating medium but also the heating wire type heaters 502, the plate-like heating wire type heater 503 and the film-like heating wire type heater 504 are used as the heating means, this invention does not fall under this.

Moreover, although in the foregoing embodiment the temperature-controlled cooling passages and the temperature-controlled cooling medium are used as the cooling means, this invention does not fall under this, and it is also possible to employ a different cooling means such as a Peltier element.

What is claimed is:

1. A casting apparatus for formation of a resin-made membrane comprising:
   a die for extruding a molten resin into a membrane;
   a cooling roll for receiving said membrane extruded from said die on its outer circumferential surface to deliver said membrane while cooling;
   a suction chamber for sucking air from between said membrane and said cooling roll to make said membrane come closely into contact with said cooling roll; and
   a temperature adjusting unit for allowing a temperature of an inner wall surface of said suction chamber to be set to a desired values,
   said temperature adjusting unit including heating means for heating said suction chamber.

2. A casting apparatus for formation of a resin-made membrane as defined in claim 1, wherein said temperature adjusting unit further includes detection means for detecting a temperature of said inner wall surface of said suction chamber, and control means for controlling said heating means on the basis of a detection result by said detection means, said heating means heating a structural member constituting said suction member.

3. A casting apparatus for formation of a resin-made membrane as defined in claim 1, wherein said temperature adjusting unit further includes cooling means for cooling said structural member, detection means for detecting a temperature of said inner wall surface of said suction chamber, and control means for controlling said heating means and said cooling means on the basis of a detection result by said detection means, said heating means heating a structural member constituting said suction chamber.

4. A casting apparatus for formation of a resin-made membrane as defined in claim 2, wherein said heating means is embedded in the interior of said structural member.

5. A casting apparatus for formation of a resin-made membrane as defined in claim 3, wherein said heating means is embedded in the interior of said structural member.

6. A casting apparatus for formation of a resin-made membrane as defined in claim 2, wherein said heating means is provided inside said structural member to constitute said inner wall surface of said suction chamber.

7. A casting apparatus for formation of a resin-made membrane as defined in claim 3, wherein said heating means is provided inside said structural member to constitute said inner wall surface of said suction chamber.

8. A casting apparatus for formation of a resin-made membrane as defined in claim 2, wherein said heating means is placed along an outer wall surface of said structural member.

9. A casting apparatus for formation of a resin-made membrane as defined in claim 3, wherein said heating means is placed along an outer wall surface of said structural member.

10. A casting apparatus for formation of a resin-made membrane as defined in claim 2, wherein said heating means is mounted on another structural member placed closely into contact with the first-mentioned structural member.

11. A casting apparatus for formation of a resin-made membrane as defined in claim 3, wherein said heating means is mounted on another structural member placed closely into contact with the first-mentioned structural member.

12. A casting apparatus for formation of a resin-made membrane as defined in claim 2, wherein said heating means comprises a heating wire type heater.

13. A casting apparatus for formation of a resin-made membrane as defined in claim 3, wherein said heating means comprises a heating wire type heater.

14. A casting apparatus for formation of a resin-made membrane as defined in claim 2, wherein said heating means comprises a fluid passage situated along said structural member organizing said suction chamber and a temperature-controlled heating medium movable within said fluid passage.

15. A casting apparatus for formation of a resin-made membrane as defined in claim 3, wherein said heating means comprises a fluid passage situated along said structural member organizing said suction chamber and a temperature-controlled heating medium movable within said fluid passage.

16. A casting apparatus for formation of a resin-made membrane as defined in claim 3, wherein said cooling means comprises a fluid passage situated along said structural member organizing said suction chamber and a temperature-controlled cooling medium movable within said fluid passage.

17. A casting apparatus for formation of a resin-made membrane as defined in claim 1, wherein said desired value is above an attachment suppressing temperature which suppresses attachment of a volatile matter onto said inner wall surface of said suction chamber.

* * * * *

UNITED STATES PATENT AND TRADEMARK OFFICE
CERTIFICATE OF CORRECTION

PATENT NO. : 6,168,412 B1
DATED : January 2, 2001
INVENTOR(S) : Kometani et al.

It is certified that error appears in the above-identified patent and that said Letters Patent is hereby corrected as shown below:

<u>Claim 2,</u>
Last line, change "suction member" to read -- suction chamber --

Signed and Sealed this

Sixth Day of November, 2001

Attest:

NICHOLAS P. GODICI
*Attesting Officer*   *Acting Director of the United States Patent and Trademark Office*